US010304102B2

(12) United States Patent
Cheng et al.

(10) Patent No.: US 10,304,102 B2
(45) Date of Patent: May 28, 2019

(54) PROVIDING STRUCTURED DATA IN REAL-TIME COMMUNICATIONS

(71) Applicant: Facebook, Inc., Menlo Park, CA (US)

(72) Inventors: Derek Chirk Yin Cheng, Issaquah, WA (US); Kwok Ngai Eric Lo, Issaquah, WA (US); Lui Lui Wong, Seattle, WA (US); Stephen Moore Davis, San Francisco, CA (US); Bowen Pan, Palo Alto, CA (US); Christopher Richard Tanner, Redwood City, CA (US); Francesco Fogu, San Francisco, CA (US); Shuo Song, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 635 days.

(21) Appl. No.: 14/991,433

(22) Filed: Jan. 8, 2016

(65) Prior Publication Data
US 2017/0200209 A1  Jul. 13, 2017

(51) Int. Cl.
*G06Q 30/06* (2012.01)
*H04L 29/06* (2006.01)
*G06Q 50/02* (2012.01)
*G06Q 50/00* (2012.01)

(52) U.S. Cl.
CPC ..... *G06Q 30/0611* (2013.01); *G06Q 30/0601* (2013.01); *G06Q 30/0619* (2013.01); *G06Q 30/0623* (2013.01); *G06Q 30/0641* (2013.01); *G06Q 50/01* (2013.01); *G06Q 50/02* (2013.01); *H04L 65/1069* (2013.01); *H04L 65/4015* (2013.01)

(58) Field of Classification Search
CPC .................................................... G06Q 50/01
See application file for complete search history.

(56) References Cited

U.S. PATENT DOCUMENTS

| 6,029,141 A * | 2/2000 | Bezos | G06Q 20/0855 |
| | | | 705/26.41 |
| 6,034,684 A * | 3/2000 | Proehl | G06F 3/0481 |
| | | | 715/764 |
| 7,082,407 B1 * | 7/2006 | Bezos | G06Q 30/00 |
| | | | 705/26.7 |

(Continued)

OTHER PUBLICATIONS

Sharma, N.K. et al., "Safeguarding Buyers with Attack-Resilient Reputation Parameters," Journal of Theoretical and Applied Electronic Commerce Research, vol. 11, Iss. 1, pp. 46-66, Jan. 2016.*

*Primary Examiner* — Nicholas D Rosen
(74) *Attorney, Agent, or Firm* — Keller Jolley Preece

(57) ABSTRACT

One or more embodiments of the disclosure provide systems and methods for improving a user experience for performing transactions between potential buyers and sellers online via real-time communications. For example, a social marketplace system enables a potential buyer to initiate a real-time communication with a seller without the potential buyer having to provide contextual information regarding the item to the seller. In one or more embodiments, the social marketplace system provides a banner, in connection with the real-time communication, populated with structured data associated with the item that the potential buyer and the seller are discussing.

20 Claims, 15 Drawing Sheets

(56) References Cited

U.S. PATENT DOCUMENTS

| | | | | |
|---|---|---|---|---|
| 7,478,054 B1* | 1/2009 | Adams | G06Q 10/10 | 705/26.43 |
| 8,392,288 B1* | 3/2013 | Miller | G06Q 40/02 | 705/26.1 |
| 8,640,048 B1* | 1/2014 | Parsons | G06F 17/2247 | 715/206 |
| 9,684,901 B2* | 6/2017 | Stuart | G06Q 30/0601 | |
| 2004/0064396 A1* | 4/2004 | Say | G06Q 30/06 | 705/37 |
| 2007/0143083 A1* | 6/2007 | Kropaczek | G21C 5/02 | 703/2 |
| 2008/0065501 A1* | 3/2008 | Stuart | G06Q 30/0601 | 705/26.1 |
| 2008/0294699 A1* | 11/2008 | Yu | G06Q 30/02 | |
| 2011/0258086 A1* | 10/2011 | Stein | G06Q 30/0603 | 705/27.2 |
| 2012/0259724 A1* | 10/2012 | Raman | G06Q 30/02 | 705/26.3 |
| 2012/0271883 A1* | 10/2012 | Montoya | H04W 4/023 | 709/204 |
| 2012/0276868 A1* | 11/2012 | Martell | H04L 12/1453 | 455/406 |
| 2012/0297314 A1* | 11/2012 | Stein | G06Q 10/10 | 715/751 |
| 2012/0311056 A1* | 12/2012 | Masuko | G06Q 30/02 | 709/206 |
| 2013/0007665 A1* | 1/2013 | Chaudhri | H04L 51/24 | 715/830 |
| 2013/0144701 A1* | 6/2013 | Kulasooriya | G06Q 20/202 | 705/14.24 |
| 2013/0151357 A1* | 6/2013 | Havas | G06Q 50/12 | 705/15 |
| 2013/0238410 A1* | 9/2013 | Fargo | G06Q 30/0208 | 705/14.11 |
| 2013/0297424 A1* | 11/2013 | Baca | G06Q 30/06 | 705/14.58 |
| 2014/0156681 A1* | 6/2014 | Lee | G06F 17/30867 | 707/754 |
| 2014/0257882 A1* | 9/2014 | Tracy | G06Q 30/0202 | 705/5 |
| 2014/0358716 A1* | 12/2014 | Kaufeldt | G06Q 30/0611 | 705/26.4 |
| 2015/0142787 A1* | 5/2015 | Kimmerling | G06F 17/3053 | 707/723 |
| 2015/0206111 A1* | 7/2015 | Sugiyama | G06Q 30/0267 | 705/14.66 |
| 2015/0324725 A1* | 11/2015 | Roesbery | G06Q 30/0639 | 705/7.39 |
| 2016/0307250 A1* | 10/2016 | McDouall | G06Q 30/0601 | |

* cited by examiner

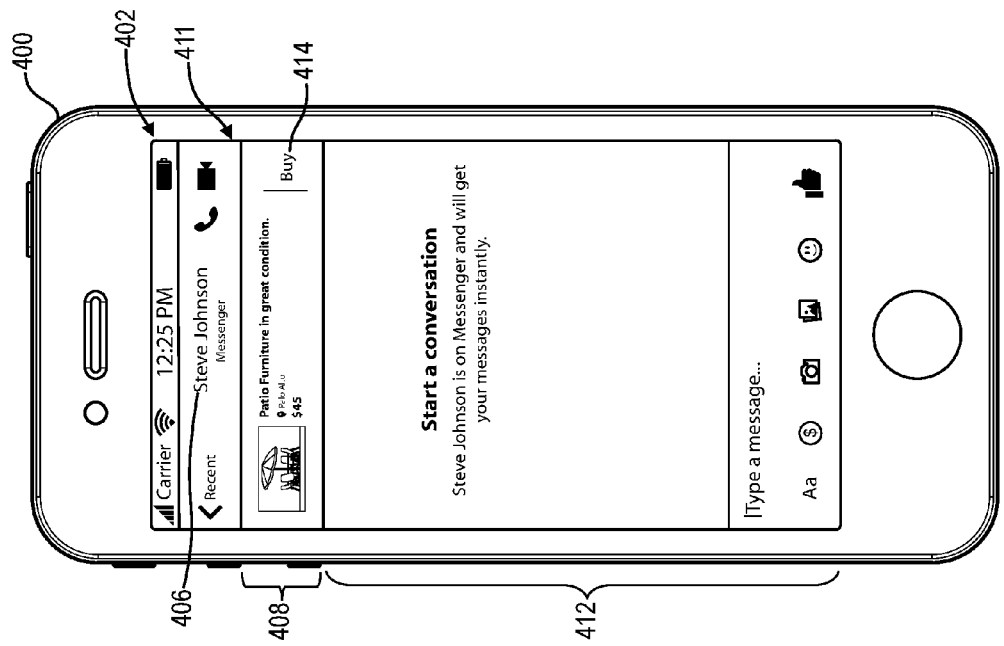
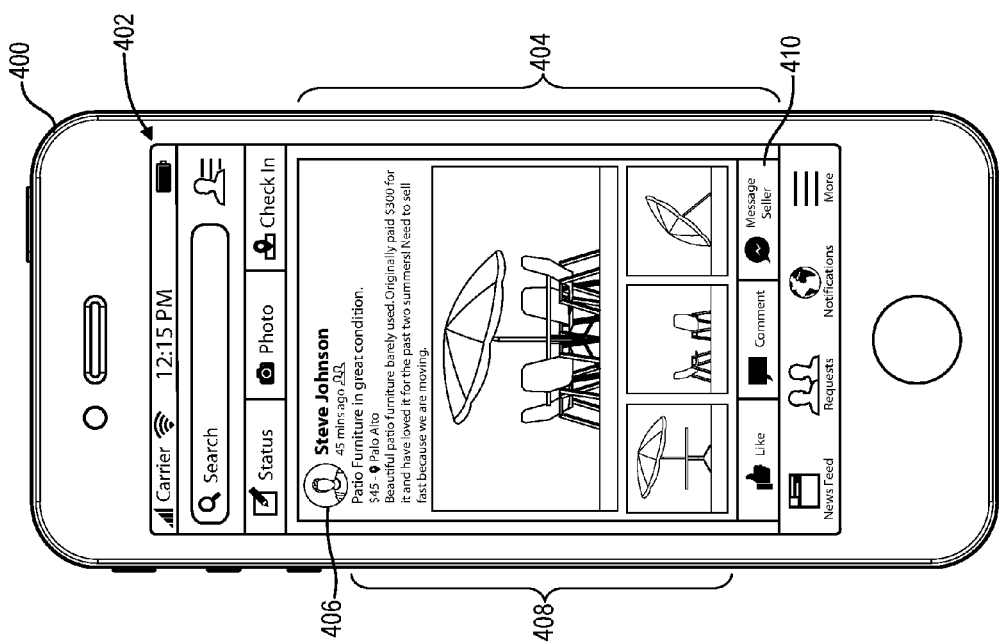
Fig. 4B
Fig. 4A

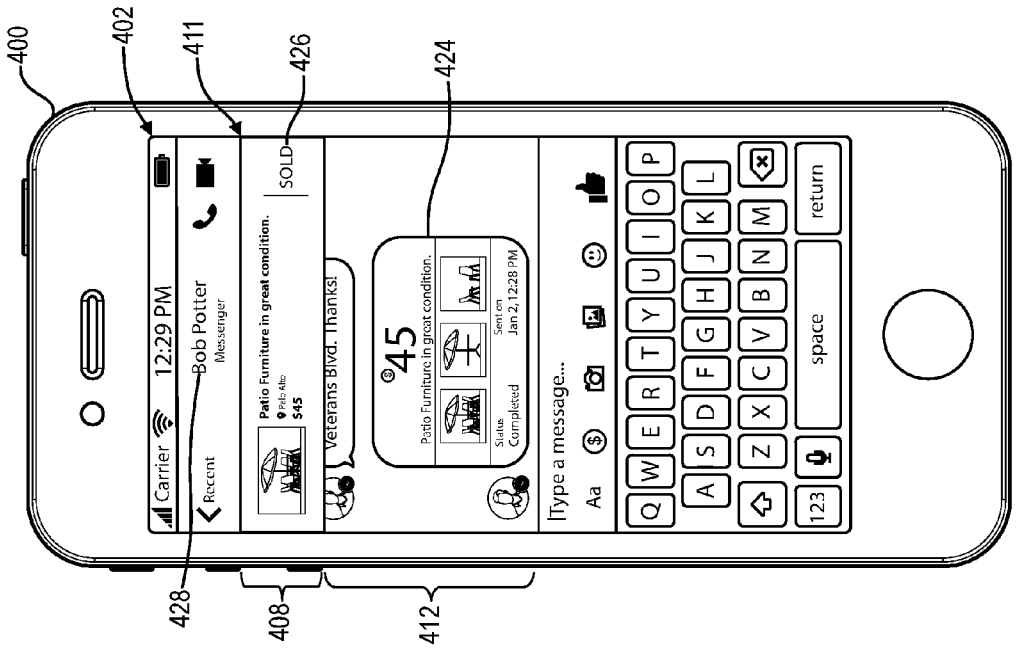
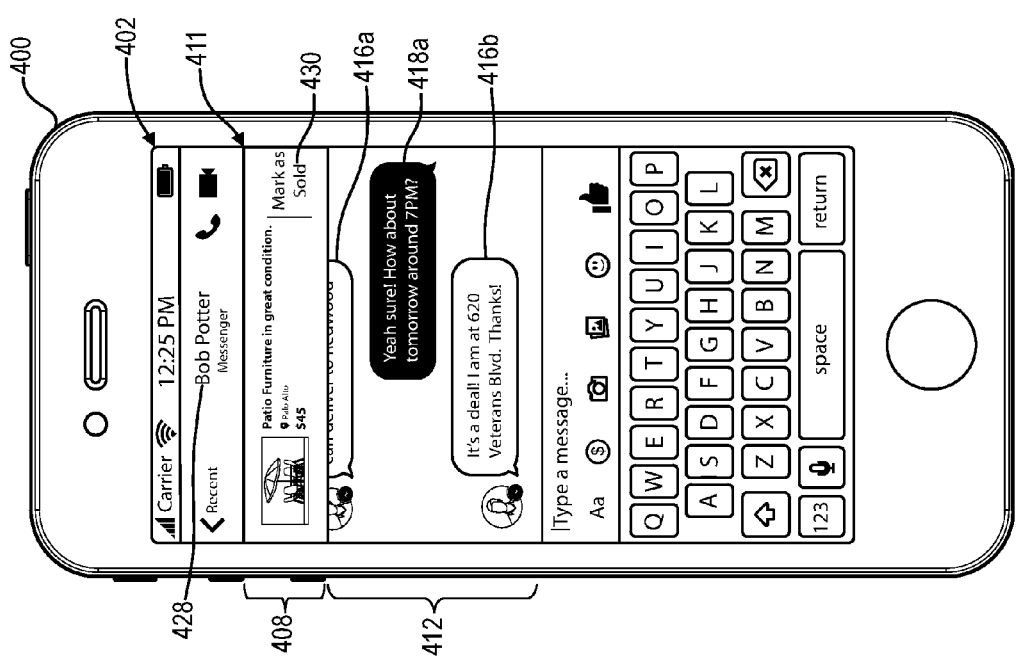
Fig. 4H
Fig. 4G

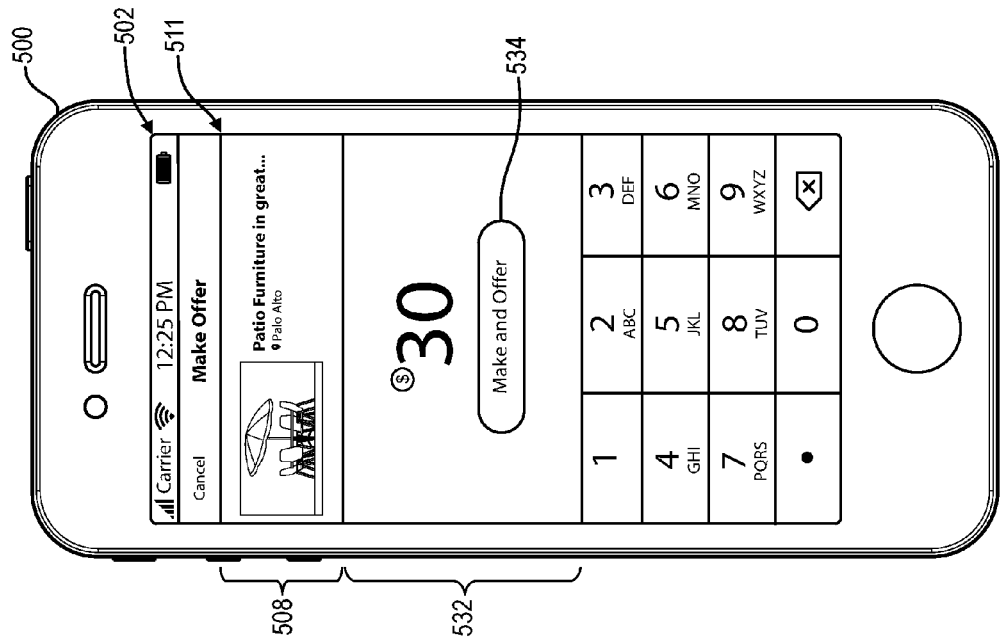
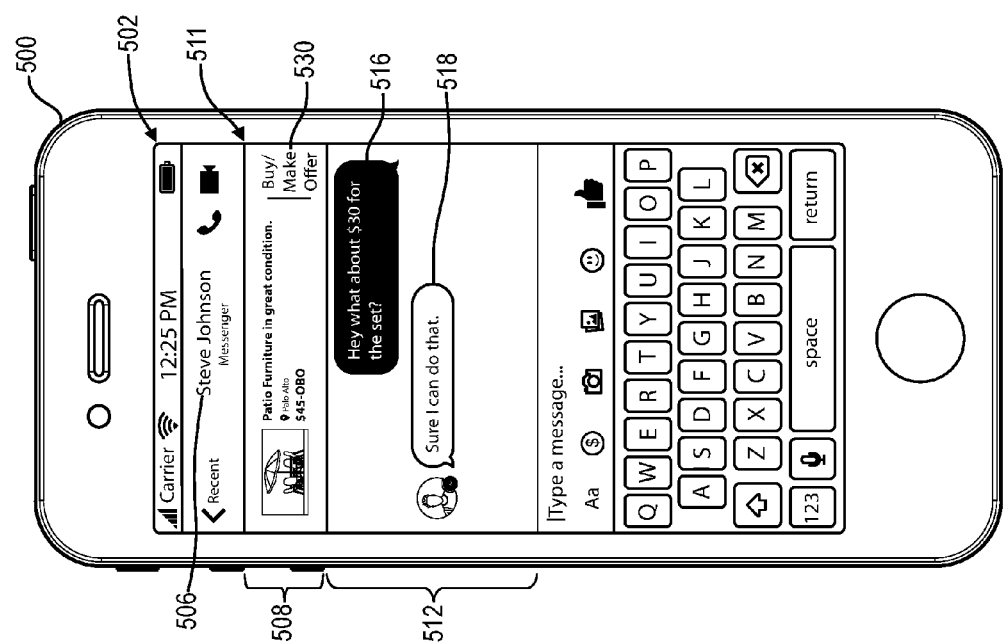
Fig. 5B
Fig. 5A

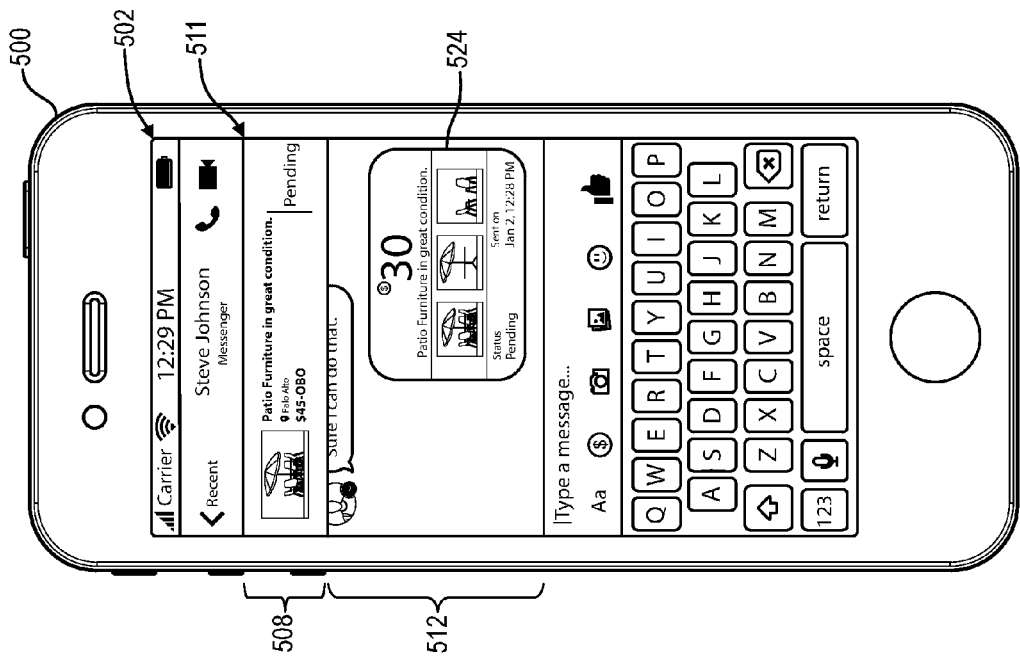
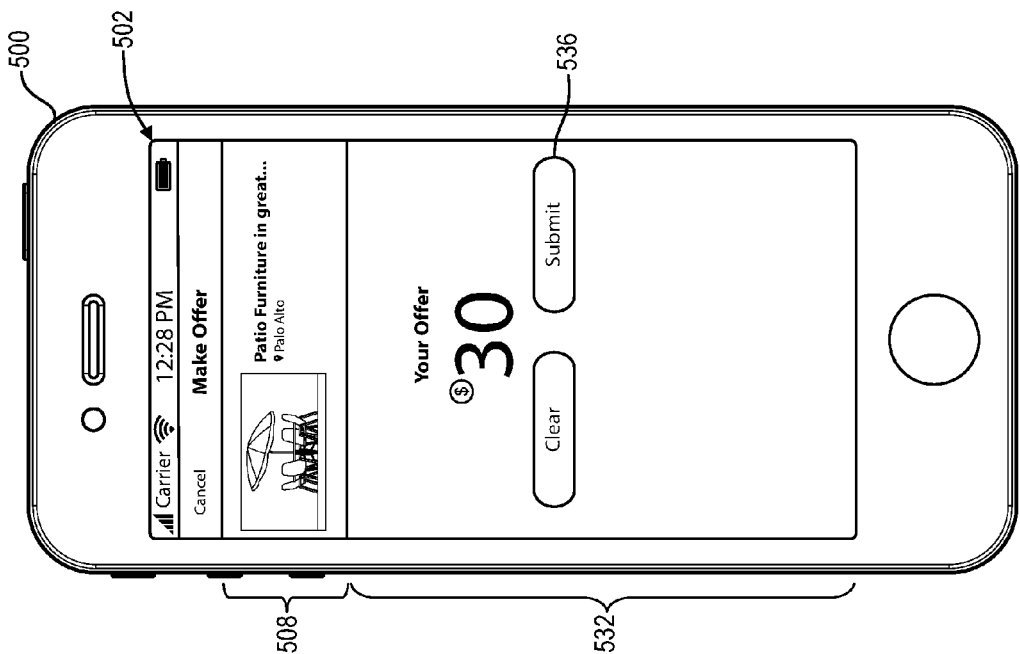
Fig. 5D
Fig. 5C

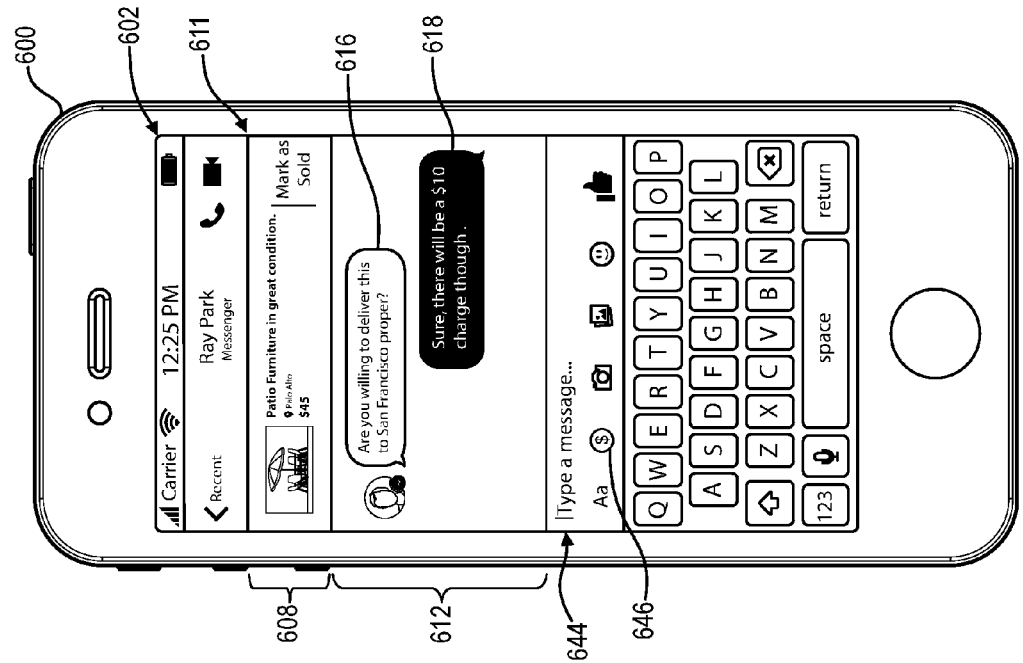
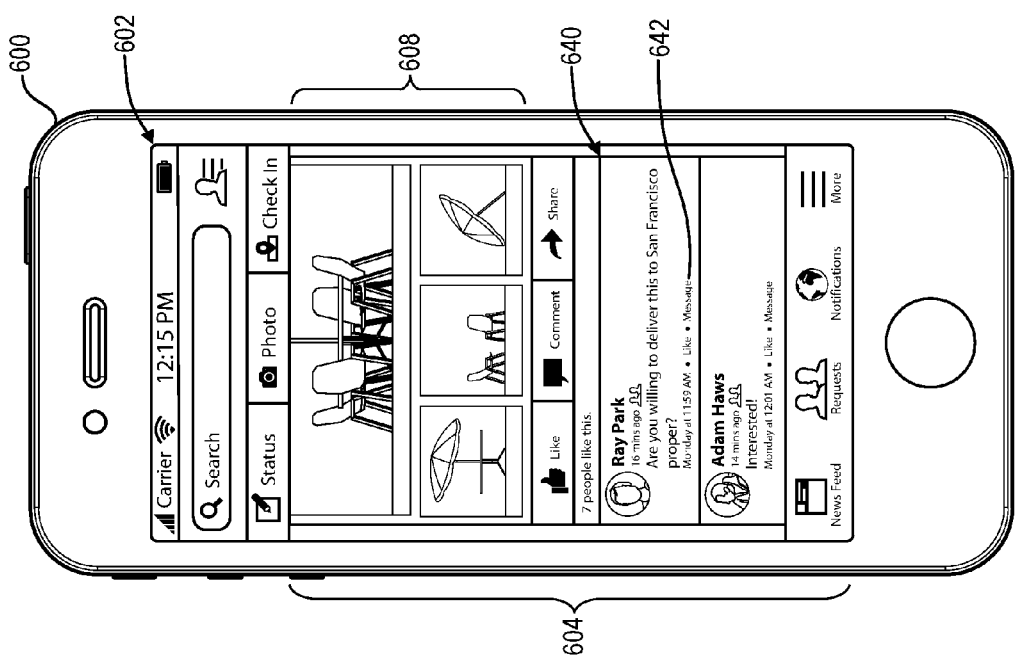
Fig. 6B
Fig. 6A

PROVIDING STRUCTURED DATA IN REAL-TIME COMMUNICATIONS

BACKGROUND

1. Technical Field

One or more embodiments relate to systems and methods for providing communication between users of a communication system. More specifically, one or more embodiments of the present invention relate to systems and methods for improving a user experience between a buyer and a seller of a product via a communication system.

2. Background and Relevant Art

Advances in computing devices and communication technologies have increased the ability for people to connect. One advantage of user connectivity is that users are able exchange goods and services with each other. For example, the modern computing devices and communication systems allow a user to sell items to other users ranging from neighbors to people in other countries. While conventional systems for selling items provide some advantages, many conventional systems suffer from a number of drawbacks.

For instance, in many conventional systems, when a buyer wants to contact a seller using a real-time communication, such as text message or instant message, the buyer generally must provide context of the sale when initiating contact with the seller. Often, the first communication from the buyer to the seller can be awkward and/or uncomfortable. For example, in reaching out to a seller, the buyer may need to provide enough context information about a good or service such that the seller can properly respond to the buyer. If not, the seller can be bombarded with inquiries from strangers that provide little or no context of whether they are potential buyers, or in the case the seller is selling multiple items, in which item the potential buyer is interested. As such, the seller may not be able to respond without having to send a response asking for more clarification and context.

In addition, when a seller is communicating with multiple potential buyers, conventional systems often require that the seller manually inform each potential buyer of any changes of modifications to the sale, such as when the price of an item drops, quantities update, or when an item sells (e.g., is sold out). For example, when a seller has two potential buyers for an item and one of the potential buyers purchases the item, the seller must inform the other potential buyer that the item has sold. Often, the seller does not inform the other potential buyer of the sale until the other potential buyer inquires about the item, that unbeknownst to the other potential buyer, is no longer for sale. This problem further compounds when the number of potential buyers increases.

As an additional disadvantage, conventional systems often require a user (e.g., a buyer and/or a seller) to navigate back and forth within a conversation thread when discussing a potential sale via text message or instant message. For example, older text messages or instant messages are often hidden as new messages are sent and received. In addition, in the case that the user is not able to respond to a message for a period of time, the user often must scroll back through older hidden messages to remind themselves of what item they are discussing and details regarding the discussion.

In the event a buyer and a seller eventually do agree on terms, conventional systems have separate systems for buyer/seller communications and for buyer/seller transactions. For example, upon agreeing to terms in a communication system, a buyer and a seller must then access a separate payment system to complete the transaction. Many conventional systems require the buyer to unnecessarily provide details to the third-party system with respect to the transaction. For example, after a buyer agrees to buy an item from a seller, the buyer logs in into a third-party system, enters the seller's information, re-enters the agreed upon details, and then the buyer can send money to the seller for the item. This process can be confusing, frustrating, and can often lead to a buyer simply choosing not to complete the purchase transaction.

Accordingly, there are a number of considerations to be made in improving a user experience related to performing transactions between potential buyers and sellers via a communication system.

SUMMARY

One or more embodiments described herein provide benefits and/or solve one or more of the foregoing or other problems in the art with systems and methods for improving a user experience for performing transactions between potential buyers and sellers online via real-time communications. For example, the principles described herein provide systems and methods that allow a potential buyer to initiate a real-time communication session with a seller without having the potential buyer manually provide contextual information regarding the item about which the potential buyer is contacting the seller. In particular, in one or more embodiments, the systems and methods disclosed herein can provide a banner in connection with a real-time communication session that automatically includes structured data of the item that the potential buyer and seller are discussing.

To illustrate, a seller provides an item for sale via a communication system. For example, the seller posts the item for sale in a social networking system or a message board. A potential buyer takes interest in the item and requests to initiate a communication with the seller. In response to the request, the systems and methods can identify structured data from the post of the item (e.g., the structured data including contextual information. In addition, the systems and methods can initiate a real-time communication session between the potential buyer and the seller and include the structured data for display within the initiated communication session. In this manner, the buyer clearly expresses interest in the item without needing to re-enter any information regarding the item. Further, the seller can quickly ascertain that the potential buyer is contacting the seller in regards to the posted item.

In addition to providing contextual information, the systems and methods can also provide a number of additional benefits. For example, the systems and methods can provide automatic updates to multiple real-time communication sessions with different buyers when the seller makes a change to the structured data associated with an item for sale. As another benefit, the systems and methods disclosed herein enable a buyer to purchase a for sale item without needing to access a third-party payment system. In particular, the systems and methods allow a buyer and seller to initiate and complete an electronic transaction within the user interface of the real-time communication session.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of one or more embodiments can be obtained, a more particular description will be rendered by reference to specific embodiments thereof that are illustrated in the accompanying drawings. It should be noted that the figures are not drawn to scale, and that elements of similar structure or function are generally represented by like reference numerals for illustrative purposes throughout the figures. These drawings depict only typical embodiments, and are not therefore considered to be limiting of its scope. Accordingly, various embodiments will be described and explained with additional specificity and detail using the accompanying drawings.

FIGS. 4A-4H illustrate a graphical user interface of a client device showing an example transaction between a buyer and a seller in accordance with one or more embodiments described herein;

FIGS. 5A-5F illustrate a graphical user interface of a client device showing another example transaction between a buyer and a seller in accordance with one or more embodiments described herein;

FIGS. 6A-6B illustrates a graphical user interface of a client device showing a seller creating a real-time communication session with a potential buyer in accordance with one or more embodiments described herein;

DETAILED DESCRIPTION

Figure 1:
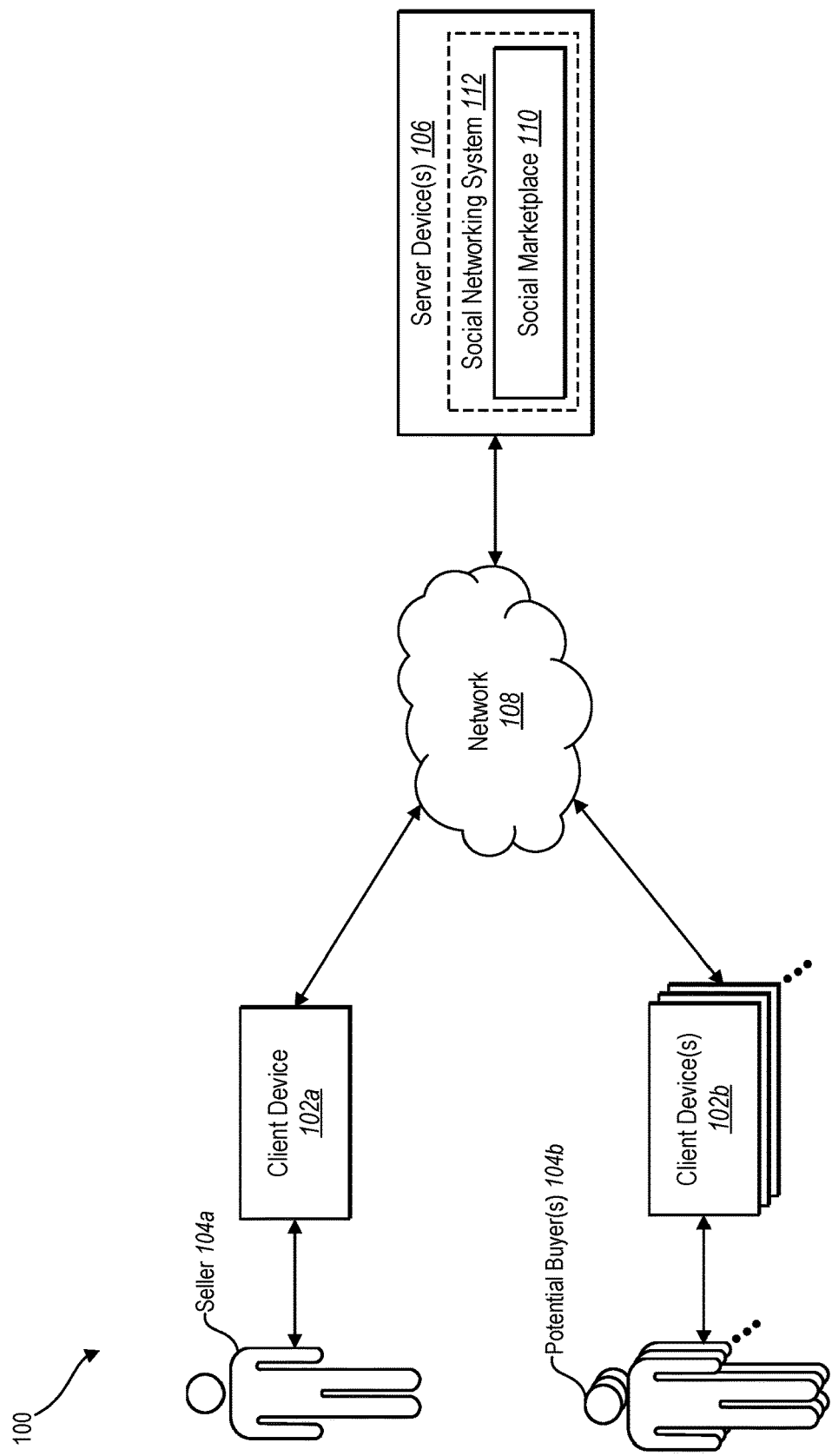
FIG. 1 illustrates an example embodiment of a communication system in accordance with one or more embodiments described herein.

Embodiments disclosed herein provide benefits and/or solve one or more of the abovementioned problems in the art with a social marketplace system that improves a user experience for performing transactions between potential buyers and sellers via real-time communications (e.g., electronic communications). In particular, one or more embodiments of the social marketplace system provide contextual information associated with a for sale item to users that desire to communicate regarding the item. For example, based on a potential buyer requesting to initiate a real-time communication session with a seller regarding an item for sale, the social marketplace system identifies structured data associated with the for sale item. The social market place system can then initiate a real-time communication session between the buyer and the seller and provide the structured data within a graphical user interface of the real-time communication session.

In one or more embodiments, the social marketplace system provides the structured data in a persistent banner within the graphical user interface. For example, a persistent banner can include the item description from the item post, a picture of the item, and/or the price of the item. The persistent banner, for example, can be positioned above a message thread. Accordingly, the social marketplace system continues to display the structured data within the graphical user interface even as the buyer and seller exchange real-time communication messages within the message thread (e.g., as new messages as added to the thread, the banner position within the graphical user interface remains constant).

Providing the structured data as context within a graphical user interface removes much of the awkwardness and friction between buyers and sellers when participating in real-time communications with each other. As mentioned above, the social marketplace system allows a buyer to easily initiate a real-time communication session with the seller regarding the for sale item without needing to re-enter information regarding the item for sale. Further, the seller can quickly ascertain that the potential buyer is contacting the seller to discuss the item for sale because the social marketplace system provides an indication of the context of the communication using the structured data.

As another advantage of the social marketplace system, as long as the buyer and the seller are discussing the for sale item, the social marketplace system provides the structured data in connection with the real-time communication session (e.g., in a banner). In this manner, the social marketplace system allows the two users to communicate with each other under the context of discussing the for sale item and not another conversation topic. When the topic between the two acquaintances changes, the social marketplace system can remove the structured data from the real-time communication session.

An additional advantage over convention systems is that the social marketplace system enables a seller to easily conduct real-time communications with multiple potential buyers at the same time regarding the same for sale item. In particular, in each real-time communication, the social marketplace system can provide the same structured data relating to the for sale item. In this manner, as the status of a for sale item changes, such as one of the potential buyers purchases the for sale item, the social marketplace system can update the structured data in each real-time communication session to indicate the item as sold. For example, the social marketplace system can mark the item as sold in a banner displayed along with each real-time communication session. In some embodiments, the social marketplace system can also send out a generated message to the remaining potential buyers that the item has sold, or is pending a sale to another buyer.

As another benefit, in one or more embodiments, the social marketplace system improves a user's buying and/or selling experience by updating information within real-time communication sessions between a seller and each potential buyer in a single update. For instance, when a seller updates the price of an item, updates an item's description, or sells an item, the systems and methods can automatically update the structured data displayed in connection with each real-time communication between the seller and each potential buyer. As such, as soon as information about an item is updated, the systems and methods can notify each potential buyer of the updated information.

In addition to providing up-to-date structured data to each real-time communication session between a seller and one or more potential buyers, the systems and methods also improve a buyer's experience by allowing a buyer to pay for items from within the real-time communication session graphical user interface. Further, if a potential buyer and a seller are negotiating a different price for an item, the seller can quickly change the price of the item by accessing the structured data in the real-time communication session and/or the potential buyer can propose an offer for the item from the real-time communication session. Unlike conventional systems, the buyer does not need to access a separate payment system to purchase an item. Additional benefits of the social marketplace system are described further below.

As used herein, the term "real-time communication" refers generally to a concurrent communication between two users, such as in a real-time communication session. Examples of real-time communications include, but are not limited to, communicating via text messaging, instant messaging, chat, audio conferencing, voice-over IP (VoIP), and/or video conferencing. In contrast, general communications, such as email, message boards, forums, etc., are not considered real-time communications for purposes of this specification.

The term "content," as used herein refers to digital data that may be transmitted over a communication network. Examples of content include, but are not limited to, digital media, text, digital photos, messages, digital video files, digital audio files, and/or streaming media. The term "content item," as used herein refers generally to a discrete portion of content. A content item may include an image, text, video segment, and/or an audio segment. For example, a content item can include a posting of a for sale item.

As used herein, the term "for sale item" may refer to a good or service offered by a seller. A for sale item can include tangible goods, such as a device, vehicle, gadget, or clothing. Alternatively, a for sale item can be intangible, such as a service. Further, for sale items can include virtual goods and services. For example, an item for sale can include digital data, such as a digital document, an application, a video, or an audio file. Additionally, while the description herein generally refers to a for sale item as a single item, the term "for sale item" can include a set of items and/or multiple items.

The term, "structured data," as used herein refers generally to data associated with a for sale item. Examples of structured data include the title of a for sale item, a brief description of the for sale item, one or more images of the for sale item, and the price of the for sale item. In addition, structured data can also include metadata associated with the for sale item, such as the location of the seller, timestamp information, and the status of the for sale item.

FIG. 1 illustrates an example embodiment of a communication system 100 (or simply, "system 100"). As shown, the system 100 includes a client device 102a and one or more client device(s) 102b (collectively "client devices 102"), and one or more server device(s) 106 that are communicatively coupled through a network 108. Although FIG. 1 illustrates a particular arrangement of the client devices 102, the server device(s) 106, and the network 108, various additional arrangements are possible. For example, the client device 102a may directly communicate with the server device(s) 106, bypassing the network 108.

As mentioned, the client devices 102 and the server device(s) 106 may communicate via the network 108, which may include one or more networks and may use one or more communication platforms or technologies suitable for transmitting data and/or communication signals. Additional details relating to the network 108 are explained below with reference to FIG. 9.

As further illustrated in FIG. 1, the system 100 includes users, such as a seller 104a and one or more potential buyers 104b (collectively "users 104"). Each of the users 104 can interface with one of the client devices 102 to access content on the server device(s) 106. To illustrate, the seller 104a can interact with the client device 102a and the one or more buyer(s) 104b can each interact with the one or more client devices 102b. Further, each of the users 104 may be an individual (i.e., human user), a business, a group, or other entity.

Each of the client devices 102 may represent various types of client devices. For example, the client devices 102 can include: a mobile device such as a mobile telephone, a smartphone, a PDA, a tablet, a laptop; a non-mobile device such as a desktop or server; or any other type of client device. Additional details and examples with respect to the client devices 102 are discussed below with respect to FIG. 8.

As shown in FIG. 1, the server device(s) 106 may include a social marketplace system 110. The social marketplace system 110 may provide an environment for the users 104 to communicate with each other. For example, the seller 102a can post for sale items in the social marketplace system 110 and the one or more buyers 102b can view the posts. Further, the social marketplace system 110 can enable the users 104 to communicate with each other via real-time communication. The social marketplace system 110 is described further in connection with FIG. 2 below.

In some embodiments, the social marketplace system 110 is included in a social networking system 112. As such, FIG. 1 illustrates an optional social networking system 112 implemented within the one or more server device(s) 106. The social networking system 112 can connect the users 104 together via various interests, people connections, and groups. The various functions of the social networking system 212 to connect people can be incorporated or leveraged by the social market, as well as provide the social marketplace system and serve as a gathering place for the users 104. Additional information regarding the social networking system 112 is provided below with respect to FIGS. 9-10.

Figure 2:
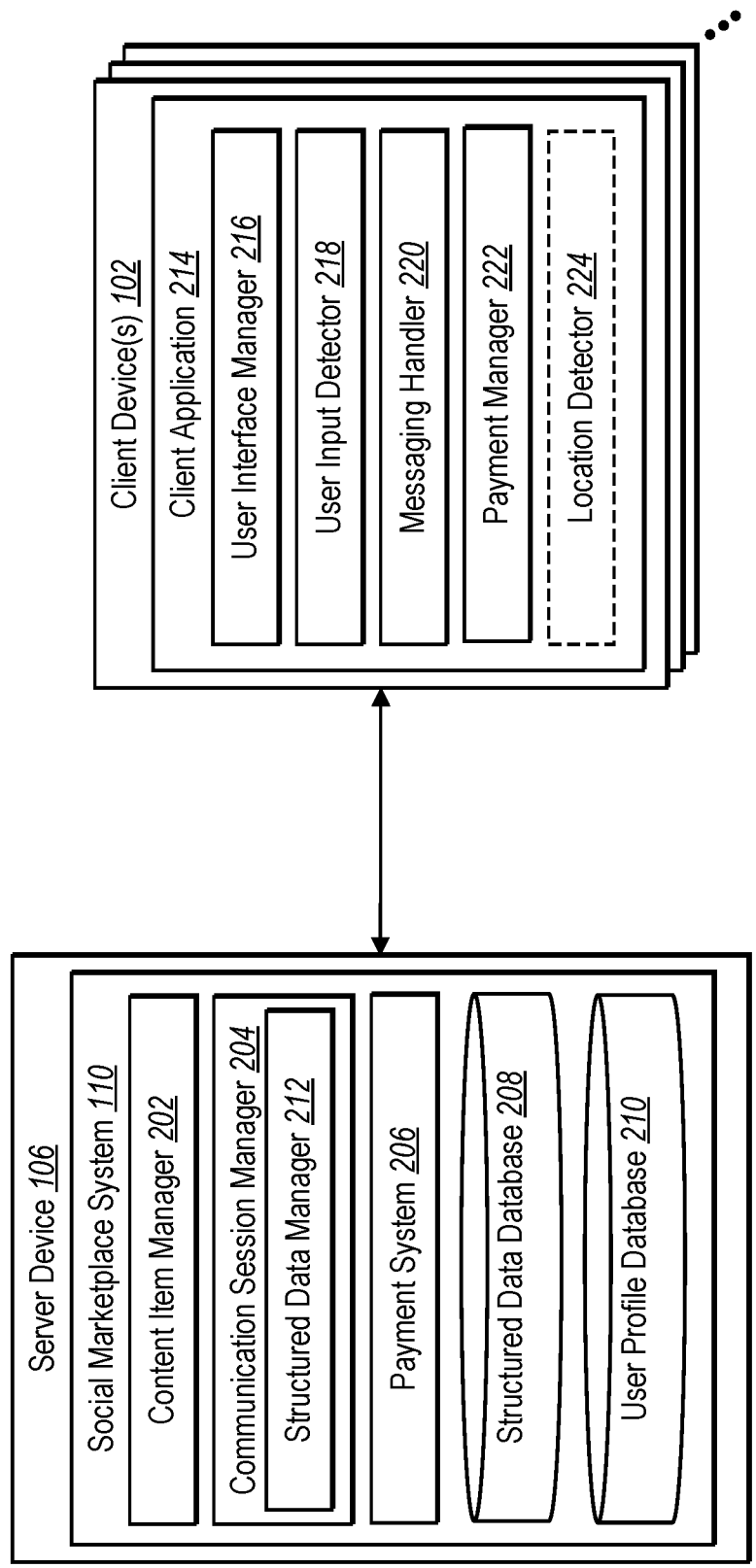
FIG. 2 illustrates a schematic diagram of one or more server devices communicating with one or more client devices in accordance with one or more embodiments described herein.

FIG. 2 illustrates a schematic diagram of a social marketplace system 110 within a server device 106 in communication with the client devices 102. For purposes of explanation, the server device 106 having the social marketplace system 110 in FIG. 2 can represent one or more embodiments of the one or more server device(s) 106 including the social marketplace system 110 discussed above with reference to FIG. 1. Likewise, the client devices 102 in FIG. 2 can be example embodiments of the client devices 102 described with reference to FIG. 1.

As illustrated in FIG. 2, the social networking system 110 can include a content item manager 202, a communication session manager 204, a payment system 206, a structured data database 208, and a user profile database 210. In general, the content item manager 202 organizes content items of for sale items posted by users, such as sellers. The communication session manager 204 facilitates real-time communications between users regarding for sale items. The payment system 206 enables a potential buyer to purchase a for sale item without exiting the social marketplace system 110. In addition, the structured data database 208 stores structured data for each for sale item, and the user profile database 210 includes user information for each user within the social marketplace system 110.

Each component of the social marketplace system 110 may be implemented using a computing device including at least one processor executing instructions that cause the social marketplace system 110 to perform the processes described herein. In some embodiments, the components of the social marketplace system 110 can be implemented by a single server device, or across multiple server devices. Although a particular number of components are shown in FIG. 2, the social marketplace system 110 can include more components or can combine the components into fewer components (such as a single component), as may be desirable for a particular implementation.

As briefly mentioned above, and as illustrated in FIG. 2, the social marketplace system 110 includes the content item manager 202. The content item manager 202 organizes content items posted by users. For example, the content item manager 202 enables a seller to post content items advertising for sale items. Likewise the content item manager 202 allows potential buyers to view the content items listing for sale items.

More specifically, when a seller is posting an item that he or she wishes to sell, the content item manager 202 can guide the seller through the process of inputting or looking-up the necessary information with respect to the for sale item. For example, the content item manager 202 can prompt a seller for the name, a brief description, condition, and price of the for sale item. The seller can also upload or select one or more images of the for sale item. Additionally, the content item manager 202 can obtain conditions attached to the sell for the for sale item, such as the item not being available until after a particular date. Further, the content item manager 202 can obtain, manually or automatically, the location of the seller. Once the content item manager 202 gathers this information, the content item manager 202 can populate a content item with the information for the for sale item.

Once the content item manager 202 obtains information regarding a for sale item, the content item manager 202 can provide the information to the structured data database 208 as structured data. For example, the content item manager 202 can provide the name, description, and price of the for sale item to the structured data database 208. In addition, the content item manager 202 can provide images of the for sale item to the structured data database 208. In one or more embodiments, for example, the structured data database 208 can organize the structured data in a table based on type of information (e.g., title, description, price, image, seller ID, etc.).

Once a content item is populated, in some embodiments, the content item manager 202 can have the seller preview and approve the content item before the content item is shared with other users. Alternatively, the content item manager 202 can automatically post the content item to other users without providing a preview. In any case, however, the content item manager 202 can allow the seller to edit the post, such as allowing the seller to modify the name or description of the item, upload additional pictures, and/or delete the content item.

The content item manager 202 can also provide selectable options in connection with each content item. For example, the content item manager 202 can provide options such as allowing a viewing user, such as a potential buyer, to "like" a content item, add a comment to a comment section of the content item, or initiate a real-time communication session with the seller. Further details and examples of content items are provided below in connection with FIG. 4A.

The communication session manager 204 facilitates real-time communication sessions between users, such as between a seller and one or more potential buyers. For example, when one user requests to communicate with another user in a real-time communication session, the communication session manager 204 initiates and maintains the real-time communication session between the two users.

As shown in FIG. 2, the communication session manager 204 includes a structured data manager 212. The structured data manager 212 provides structured data in connection with a real-time communication session. For instance, when two users are discussing a for sale item, the structured data manager 212 ensures that structured data associated with the for sale item is provided in connection with the real-time communication session. For example, in one or more embodiments, the structured data manager 212 provides the structured data in a banner within the graphical user interface of the real-time communication session on each of the sellers client device and the buyer client device, as described in detail with respect to FIG. 4. Alternatively, the structured data manager 212 can provide the structured data as an expandable pop-up or overlay displayed in connection with the real-time communication session.

More specifically, the structured data manager 212 can provide structured data including the name of a for sale item (e.g., a title of the post) and an image of the for sale item (if available) in connection with a real-time communication session between two users. For example, the structured data manager 212 can identify the for sale item, obtain the corresponding structured data from the structured data database 208, and provide relevant information from the identified structured data along with the real-time communication session discussing the for sale item.

As briefly mentioned, and as shown in FIG. 2, the social marketplace system 110 includes a payment system 206. The payment system 206 allows a user to provide payment to another user within the social networking system 110. In some embodiments, when a potential buyer selects an option to buy a for sale item, the payment system 206 enables the potential buyer to quickly and conveniently send money from an account of the buyer to an account of the seller using pre-stored payment data. If a potential buyer does not have pre-stored payment data, the payment system 206 can guide the potential buyer through the process of adding and storing payment information. Likewise, the payment system 206 can use pre-stored payment information of the seller to transfer funds to an account of the seller.

In addition, the payment system 206 also allows buyers and sellers to negotiate a price for an item that is for sale. For example, the payment system 206 enables potential buyers to present offers to a seller and the seller to accept or deny the offer. Likewise, the payment system 206 allows a seller to quickly change the price of an item, such as add shipping costs or local taxes into the price of the item. For example, the market place system 110 allows a seller to change a price of a for sale item from within a graphical user interface of a real-time communication session, as will be discussed in detail further below.

Along these lines, the payment system 206 also allows a user (e.g., the buyer or seller) to send money to other users anytime during a real-time communication. For example, the payment system 206 can enable a payment options graphical element to appear when discussing a for sale item within a real-time communication graphical user interface. In this manner, one user can provide a customized payment to another user, which allows flexibility between the parties for any type of agreement that the parties may make.

As shown in FIG. 2, the social marketplace system 110 includes a structured data database 208 and a user profile database 210. As mentioned above, the structured data database 208 includes structured data associated with for sale items. For example, the structured data database 208 includes data and metadata associated with for sale items.

The user profile database 210 stores user information, such as personal information about a user (e.g., name, gender, age, birth date, hometown, etc.), contact information (e.g., residence address, mailing address, current city, email addresses, phone numbers, screen names, etc.), educational information (e.g., school, highest schooling level obtained, time period, class year, concentration, degree, etc.), employment information (e.g., employer, position, employer locations, employment history, etc.), family and relationship information (e.g., married to, engaged to, partners with, parents of, siblings of, children of, cousin of, relationship with, etc.), and any other type of personal or demographic information.

The user profile database 210 can also store a payment profile for each user. A payment profile can include user IDs created uniquely for each registered user as well as payment credentials. For example, a user can create an "account" and provide payment information to the payment system 206. The payment system 206 can then save that payment information in the user profile database 240.

In one or more embodiments, the user profile database 210 maintains, in relation to a user's payment profile: a first name, a middle name, a last name, a payment card number (e.g., a credit card, debit card) along with an expiration date (year and/or month) of the payment card, a card security code of the payment card (e.g., a Card Verification Value (CVV or CVV2)), a billing address (including street name, house number, city, state or province, zip code, country, etc.) associated with the credit card, a phone number associated with the credit card, one or more shipping addresses (including similar fields as the billing address). When the payment card comprises a debit card, the profile storage module can also store a personal identification number (PIN) for the debit card.

As shown in FIG. 2, the client devices 102 include a client application 214. The client application 214 can work with the social marketplace system 110 on the server device 106 to enable users to post and view content items, request and participate in real-time communication sessions with other users, and perform financial transactions. As mentioned above, the client devices 102 shown in FIG. 2 can represent a client device associated with a seller or a client device associated with a potential buyer.

The client application 214 can include a user interface manager 216, a user input detector 218, a messaging handler 220, a payment manager 222, and an optional location detector 224. Each of the components 216-224 of the client application 214 can communicate with each other using any suitable communication technologies. It will be recognized that although the components 216-224 of the client application 214 are shown to be separate in FIG. 2, any of the components 216-224 of the client application 214 may be combined into fewer components, such as into a single facility or module, or divided into more components as may serve a particular embodiment.

The components 216-224 of the client application 214 can comprise software, hardware, or both. For example, the components 216-224 of the client application 214 can comprise computer instructions stored on a non-transitory computer-readable storage medium and executable by at least one processor of the client devices 102. When executed by the at least one processor, the computer-executable instructions can cause the client devices 102 to perform the methods and processes described herein. Alternatively, the components 216-224 of the client application 214 can comprise hardware, such as a special purpose processing device to perform a certain function or group of functions. Additionally or alternatively, the components 216-224 of the client application 214 can comprise a combination of computer-executable instructions and hardware.

In one or more embodiments, the client application 214 can be a native application installed on each of the client devices 102. For example, client application 214 may be a mobile application that installs and runs on a mobile device, such as a smart phone or a tablet. Alternatively, the client application 214 can be a desktop application, widget, or other form of a native computer program. Further, the client application 214 may be a remote application that each of the client devices 102 access. For example, the client application 214 may be a web application that is executed within a web browser of each of the client devices 102.

As mentioned above, and as shown in FIG. 2, the client application 214 includes a user interface manager 216. The user interface manager 216 can provide, manage, and/or control a graphical user interface (or simply "user interface") that allows a user to compose, view, and send content items (e.g., posts and messages), manage communications between users, as well as send and receive payments. For example, the user interface manager 216 can provide a user interface that facilitates the composition of a content item. Additionally, the user interface manager 216 can provide a user interface to facilitate the composition of a real-time communication, such as an instant message. Likewise, the user interface manager 216 can provide a user interface that displays content items as well as displays a real-time communication session between users.

More specifically, the user interface manager 216 may facilitate the display of a user interface (e.g., by way of a display device associated with the client devices 102). For example, the user interface may be composed of a plurality of graphical components, objects, and/or elements that allow a user to compose and/or view content items. More particularly, the user interface manager 216 may direct the client devices 102 to display a group of graphical components, objects and/or elements that enable a user to view a real-time communication with respect to a for sale item. FIGS. 4A-4H below provide example user interfaces that enable users to view a content item of a for sale item and participating in a real-time communication session with respect to the item for sale.

In addition, the user interface manager 216 may direct the client devices 102 to display a one or more graphical objects or elements that facilitate user input for composing and sending a message in a real-time communication session. To illustrate, the user interface manager 216 may provide a user interface that allows a user to provide user input to the client application 214 as well as allows a user to purchase for sale items from other users.

In addition to the forgoing, the user interface manager 216 can receive instructions or communications from one or more components of the client application 214 to display updated message information, status of the payment, and/or available actions. The user interface manager 216 can update an available option based on whether a particular options is available at a particular point within the transaction process. The user interface manager 216 can add, remove, and/or update various other selectable actions, as will be discussed below.

The user interface manager 216 can facilitate the input of text or other data to be included in an electronic communication or message. For example, the user interface manager 216 can provide a user interface that includes a keyboard. A user can interact with the keyboard using one or more touch gestures to select text to be included in an electronic communication. For example, a user can use the keyboard to enter a message for sale item in a real-time communication session. In addition to text, the user interface, including the keyboard interface, can facilitate the input of various other characters, symbols, icons, or other character information.

As further illustrated in FIG. 2, the client application 214 can include a user input detector 218. In one or more embodiments, the user input detector 218 can detect, receive, and/or facilitate user input in any suitable manner. In some examples, the user input detector 218 can detect one or more user interactions with respect to the user interface. As referred to herein, a "user interaction" means a single interaction, or combination of interactions, received from a user by way of one or more input devices.

For example, user input detector 218 can detect a user interaction from a keyboard, mouse, touch pad, touch screen, and/or any other input device. In the event the client devices 102 include a touch screen, the user input detector 218 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The client application 214 can perform one or more functions in response to the user input detector 218 detecting user input and/or receiving other data. Generally, a user can control, navigate within, and otherwise use the client application 214 by providing one or more user inputs that the user input detector 218 can detect. For example, in response to the user input detector 218 detecting user input, one or more components of the client application 214 allow a user to select a recipient for a real-time communication, compose a message in the real-time communication, select content to include in the message, and/or send the message to the recipient. Additionally, in response to the user input detector 218 detecting user input, one or more components of the client application 214 allow a user to navigate through one or more user interfaces to review received messages in a real-time communication session.

In one or more embodiments, in response to the user input detector 218 detecting one or more user inputs, the client application 214 can allow the user to create a content item for a item for sale to send to one or more other users. For example, a user wanting to sell an item can post the for sale item within a content item shared with other users by interacting with a content item element provided on a menu within a user interface. Upon detecting the user interaction with the content item element, the user input detector 218 can cause the user interface manager 216 to provide a user interface for creating the content item. Therefore, in response to the user input detector 218 detecting one or more user inputs, the client application 214 can allow a user to create a customized content item, as described above.

As further illustrated in FIG. 2, the client application 214 can include a message handler 220 that manages messages provided to or sent from the client application 214. For example, the message handler 220 can interact with the user interface manager 216 and the user input detector 218 to coordinate the sending and receiving of messages within a real-time communication session. The message handler 220 may direct the sending and receiving of messages to and from the social marketplace system 110 over the course of a real-time communication session between users. The message handler 220 may organize incoming and outgoing messages and direct the user interface manager 216 to display messages.

In one or more embodiments, the message handler 220 can facilitate receiving and sending data via the client application 214. In particular, message handler 220 can facilitate sending and receiving messages. For example, the message handler 220 can package content to be included in a message and format the message in any necessary form that is able to be sent through one or more communication channels and using an appropriate communication protocol, as described herein. Likewise, the message handler 220 can process messages the client device 214 receives from other users.

The message handler 220 can also provide access to other local or remote data that the client application 214 can use to compose, send, and receive messages. For instance, the message handler 220 can obtain access to structured data for a for sale item that is the topic of a real-time communication. For example, the messaging handler 220 can obtain structured data and provide the structured data to the user interface manager 216 to enable the user interface manager 216 to display the structured data with a real-time communication session, such as in a banner or pop-out element.

In addition, the message handler 220 can work with the payment manager 222 to facilitate the sending of a payment within a real-time communication session. The payment manager 222 can enable a user, such as a potential buyer to send a payment to a seller for an item within a real-time communication session. The payment manager 222 can work with the payment system 206 on the social marketplace system 110 to access payment information for a potential buyer and a seller. Also, as described above, the payment manager 222 can work with the payment system 206 to set up a payment profile for users of the social marketplace system 110.

As a payment transaction progresses, the messaging handler 220 can display payment progress within a real-time communication session. For example, the messaging handler 220 can indicate when a payment is pending and/or complete. Further, the messaging handler 220 can also provide a receipt, provided by the payment manager 222, to a buyer and seller for a successful transaction for an item. An example of payment progress and providing a receipt is shown below in FIGS. 4A-4H.

The client application 214 can optionally include a location detector 224. The location detector 224 can access or identify a location of client devices based on GPS information from the client device, cell tower triangulation, WIFI received signal strength indication, WIFI wireless fingerprinting, radio-frequency identification, near-field communication, by analyzing messages, or based on data from other sources. The location detector 224 can then provide the location of the client device to the client application 214 and/or social marketplace system 110. For example, the location detector 224 can provide the location of the client device for a seller to the content item manager 202 and the content item manager 202 can populate the received location in a content item for a for sale item.

Figure 3:
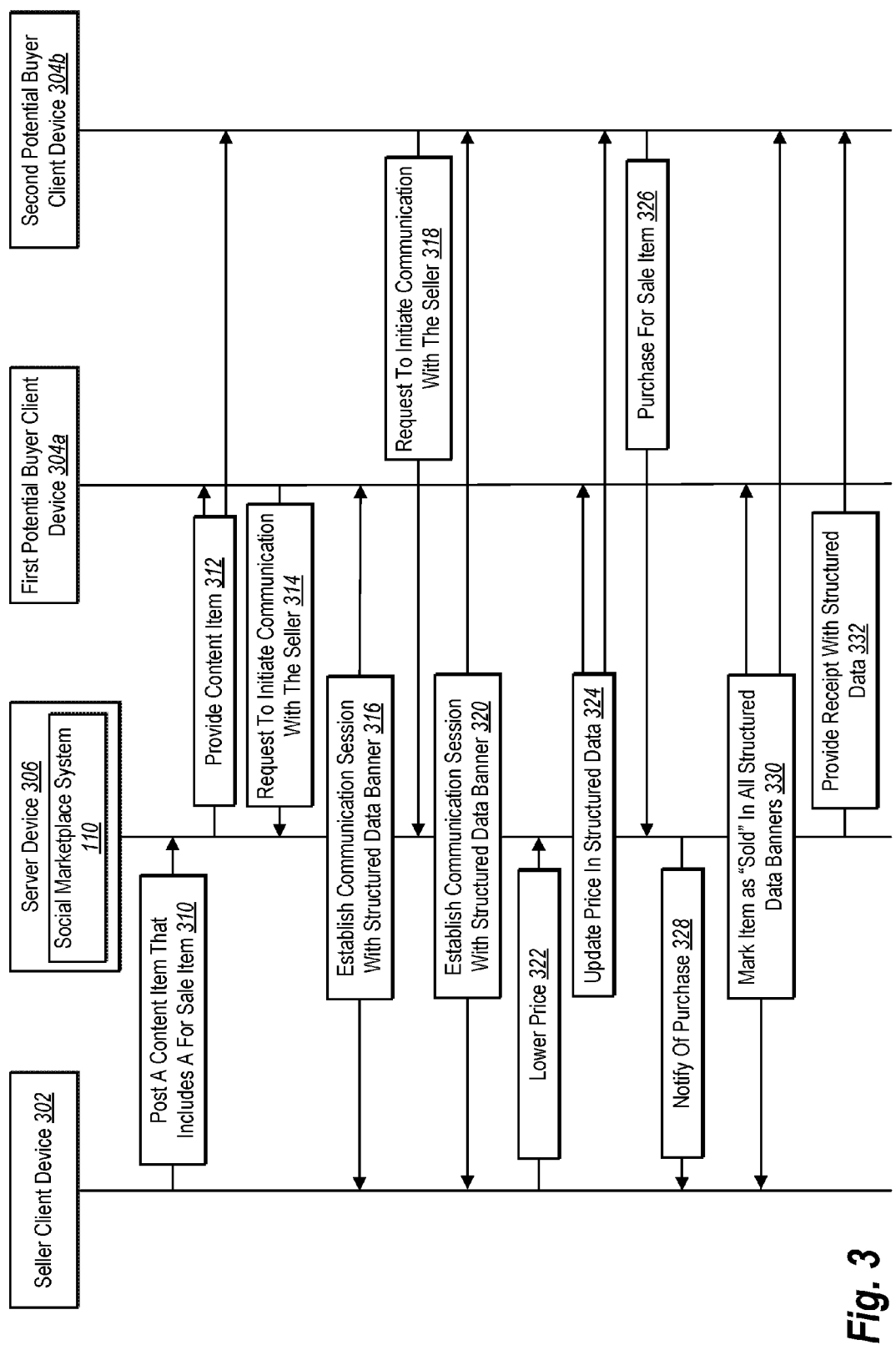
FIG. 3 illustrates a method-flow diagram showing real-time communication sessions between various devices in accordance with one or more embodiments described herein.

FIG. 3 illustrates a method-flow diagram showing real-time communications between various client devices. As shown, FIG. 3 includes a seller client device 302, a server device 306, a first potential buyer client device 304a, and a second potential buyer client device 304b. The client devices (i.e., the seller client device 302, the first potential buyer client device 304a, and the second potential buyer client device 304b) can be example embodiments of the client devices 102 described above. Similarly, the server device 306, which includes a social marketplace system 110, can be an example embodiment of the server device 306 that includes the social marketplace system 110 described above.

As described in additional detail below, FIG. 3 shows interactions between a seller and two potential buyers regarding a for sale item. The social marketplace system 110 on the server device 306 facilitates the interactions between the seller and the two potential buyers, including two real-time communication sessions. In particular, in step 310, the seller, via the seller client device 302, posts a content item to the social marketplace system 100 that includes an item for sale.

As shown in step 312, the social marketplace system 110 can provide the content item having the for sale item to the first potential buyer and the second potential buyer via their respective client devices. In addition, the social marketplace system 110 can make the content item available to other users of the social marketplace system 110. In some cases, the social marketplace system 110 only shares the content item with users that subscribe to posts from the seller or groups to which the seller belongs. In other words, the seller can control which users can view the content item.

In step 314, the first potential buyer requests to initiate communication with the seller. For example, the first potential buyer accesses the social marketplace system 110 using the first potential buyer client device 304a and views the posted content item advertising the for sale item. The first potential buyer may select an option to communicate with the seller, such as select an element that is labeled "message seller" or "contact seller." In response, the social marketplace system 110 enables a real-time communication session between the first potential buyer and the seller, the real-time communication session having a banner showing structured data for the for sale item, as shown in step 316. In particular, the social marketplace system 110 can identify structured data from the posted content item and include the structured data with a real-time communication session between the first potential buyer and the seller. As shown in the figures below, the social marketplace system 110 can include information such as the name, price, location, brief description, and status of the for sale item within the banner. In this manner, the context for the real-time communication session is pre-established, without requiring any further action by either the first potential buyer or the seller.

In step 318, the second potential buyer, via the second potential buyer client device 304b can request to initiate communication with the seller. In response, the social marketplace system 110 enables a real-time communication session between the second potential buyer and the seller, as shown in step 320. Again, the real-time communication session can include a banner showing structured data for the for sale item.

At this point, the seller is participating in two real-time communication sessions, one with the first potential buyer and another with the second potential buyer. In addition, both real-time communication sessions are displaying a banner that includes structured data of the same for sale item. As part of one conversation, one of the potential buyers may offer a lower price for the item. To illustrate, the second potential buyer may request that the seller lower the price of the for sale item within the real-time communication session between the second potential buyer and the seller. In response, the seller lowers the price of the for sale item, as step 322 illustrates. Alternatively, the seller may lower the price of the for sale item for other reasons, such as trying to quickly sell the item.

When any part of the structured data changes, the social marketplace system 110 applies the update to each element that includes the structured data. For example, when the seller changes the price of a for sale item, the social marketplace system 110 updates the content item to show the updated price. In addition, the social marketplace system 110 updates the banners in each real-time communication session displaying the structured data. In this manner, if the seller makes a change to the structured data for the for sale item in one location, the social marketplace system 110 can automatically apply the update to the remaining locations displaying the structured data. Thus, as shown in step 324, the social marketplace system 110 provides the updated price in the structured data to the first potential buyer client device 304a and the second potential buyer client device 304b in both the real-time communication session and the content items.

After the price of the for sale item updates, the second potential buyer purchases the for sale item, as step 326 illustrates. In particular, the second potential buyer notices that the price for the for sale item has been lowed, selects the purchase option within the banner displayed in the real-time communication session, and completes the purchase. Additional detail regarding the purchase process is provided below.

In step 328, the social marketplace system 110 notifies the seller of the purchase. For example, the social marketplace system 110 provides a notification to the seller that the second potential buyer has purchased the for sale item. The notification can be a generated message within the real-time communication session between the second potential buyer and the seller. Additionally, and/or alternatively, the notification can be separate from the real-time communication session, such as a push notification, email, text message, or another type of notification.

In conjunction with notifying the seller of the purchase, the social marketplace system 110 can also update the structured data across the social marketplace system 110 to indicate that the for sale item has sold. For example, as shown in step 330, the social marketplace system 110 marks the item as "sold" within the structured data banners displayed in the real-time communication session between the first potential buyer and the seller and between the second potential buyer and the seller. In this manner, the first potential buyer can be immediately notified when an item has been sold. In some embodiments, the social marketplace system 110 can send an automated message to the first potential buyer in the real-time communication session between the first potential buyer and the seller indicating that the for sale item has been sold to another buyer. For instance, the social marketplace system 110 may send the automated message on behalf of the seller. The automated message may be within the banner showing structured data. Alternatively, the notification may be a push notification, email, text message, or other type of notification announcing that the for sale item is no longer available.

Along with updating the structured data in the real-time communication sessions, the social marketplace system 110 can also update the for sale item as sold within the original content item. As such, potential buyers that did not engage in a real-time communication session with the seller, but that showed interest in the for sale item can be informed that the item has sold. Furthermore, the social marketplace system can provide the updated structured data to elements that include the structured data across multiple communication platform, such as mobile application communication platforms, web-interface communication platforms, and multimedia communication platforms.

In addition to notifying each potential buyer that the for sale item has sold, the social marketplace system 110 can also provide the buyer with a receipt. In particular, the social marketplace system 110 can provide a receipt that includes the structured data, as shown in step 332. For example, the social marketplace system 110 can include the name, sale price, and one or more images of the item as part of the receipt. An example of a receipt is provided in FIG. 4H below.

FIGS. 4A-4H illustrate a graphical user interface of a client device 400 showing an example transaction between a buyer and a seller. In particular, FIGS. 4A-4H show an example graphical user interface 402 (or simply, GUI 402) on a client device 400. The client device 400 may include a touch screen where a user (e.g., a seller or a potential buyer) can provide input. Further, the client device 400 can be an example embodiment of one of the client devices 102 described above.

As shown in FIG. 4A, the GUI 402 shows a content item 404 within a social marketplace system (and/or a social networking system). The content item 404 shows a patio furniture set for sale. In particular, a seller 406, Steve Johnson, has posted the content item 404 within the social marketplace system. Users who follow Steve Johnson, groups to which the Steve Johnson belongs, and/or that search for items being sold by other users may come across the content item 404 advertising the patio furniture set.

As part of the content item 404, the seller 406 includes information about the for patio furniture set. For example, the Steve Johnson provides a name (i.e., "Patio Furniture in great condition"), a price (i.e., $45), a location (i.e., "Palo Alto"), a brief description, and images of the patio furniture set. By identifying the information provided by Steve Johnson, the social marketplace system can create and store structured data 408 corresponding to the patio furniture set. In other words, the social marketplace system can create and store structured data 408 that includes the name, price, location, description, and pictures of the patio furniture set.

As shown, the content item 404 also includes a contact seller element 410 (e.g., the "message seller" virtual button) for a potential buyer to contact the Steve Johnson. As such, a potential buyer who would like further information regarding the patio furniture set can select the contact seller element 410 to request a communication session with the seller 406 Steve Johnson. To illustrate, a potential buyer selects the contact seller element 410. In response, the GUI 402 changes from the content item 404 to a real-time communication session, as shown in FIG. 4B. More specifically, the GUI 402 in FIG. 4B shows the result of the social marketplace system establishing a real-time communication session 412 between the potential buyer who selected the contact seller element 410 in the content item 404 and Steve Johnson.

In connection with the real-time communication session 412, the GUI 402 in FIG. 4B shows a banner 411 that includes the structured data 408 from the content item 404. In other words, upon the potential buyer selecting the contact seller element 410, the social marketplace system establishes a real-time communication session 412 as well as provides a banner 411 that provides context for the real-time communication session 412. Specifically, the banner 411 indicates that the real-time communication session is about the patio furniture set for sale.

The banner 411 also includes a purchase option 414 (e.g., the "Buy" virtual button). The potential buyer, at anytime during the real-time communication session 412, can select the purchase option 414 to buy the for sale item included in the banner 411. Selecting the purchase option is described below with respect to FIG. 4E.

Figure 4D:
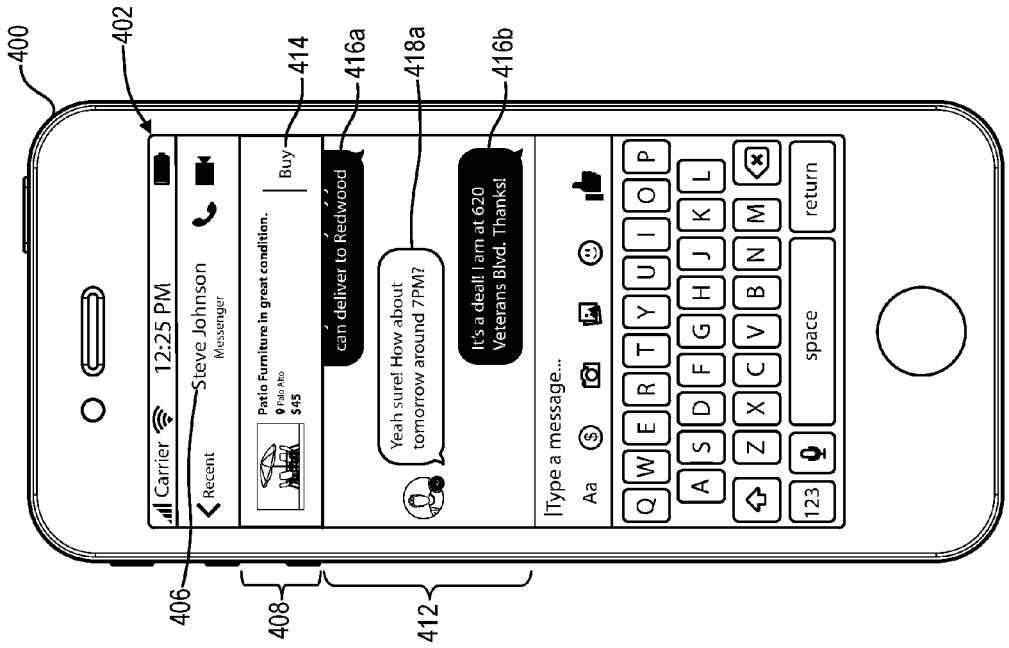
Figure 4C:
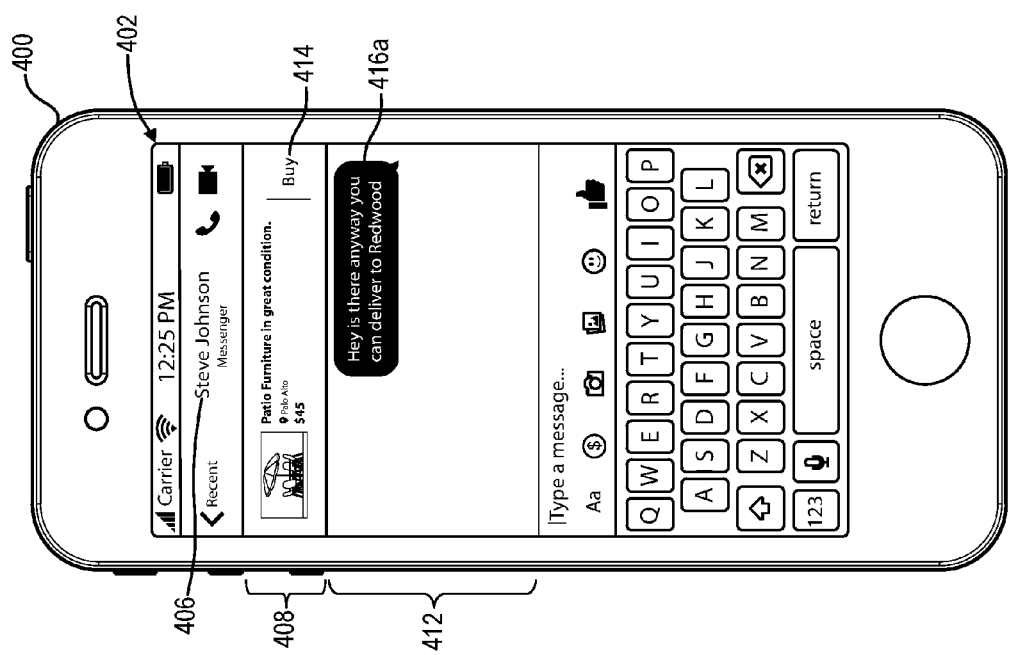

In FIG. 4C, the potential buyer sends a message 416a to the seller 406 within the real-time communication session 412. Because the real-time communication session 412 is displayed with the GUI 402 next to the banner 411 of the structured data 408, the potential buyer can directly ask questions about the patio furniture set without needing to awkwardly establish that the conversation is about the patio furniture set. Further, using the banner 411, the potential buyer can ascertain that the patio furniture set is still available for purchase and not already sold to another buyer.

FIG. 4D shows the seller 406 Steve Johnson responding to the potential buyer within the real-time communication session 412. In particular, FIG. 4D shows the seller 406 answering the potential buyer's questions in a reply message 418a. Because the GUI 402 presents the real-time communication session 412 next to the banner 411 displaying the structured data 408 for the patio furniture set, the seller 406 Steve Johnson can easily determine what item the potential buyer is asking about and quickly provide a response. Based on Steve Johnson's reply message 418a, the potential buyer provides a confirmation message 416b within the real-time communication session 412.

When the potential buyer has decided to purchase the for sale item, the potential buyer can select the purchase option 414. As shown in FIG. 4D, the purchase option 414 is shown in the banner 411 within the GUI 402. Alternatively, the purchase option can be located elsewhere in the GUI 402 in connection with the real-time communication session 412. Further, in some embodiments, the purchase option 414 may also be located within the content item 404.

Figure 4F:
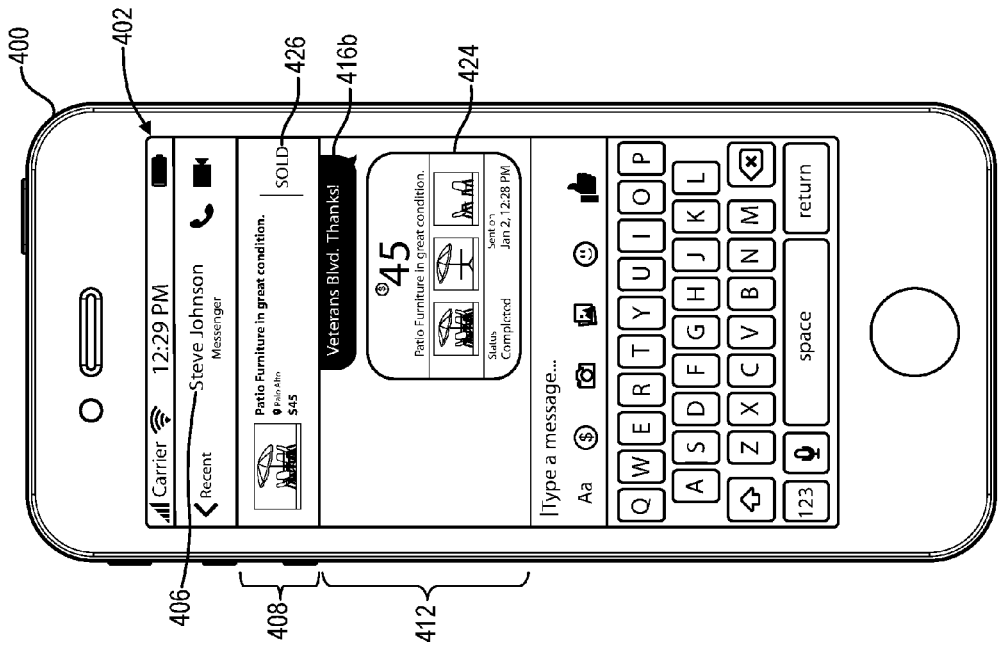
Figure 4E:
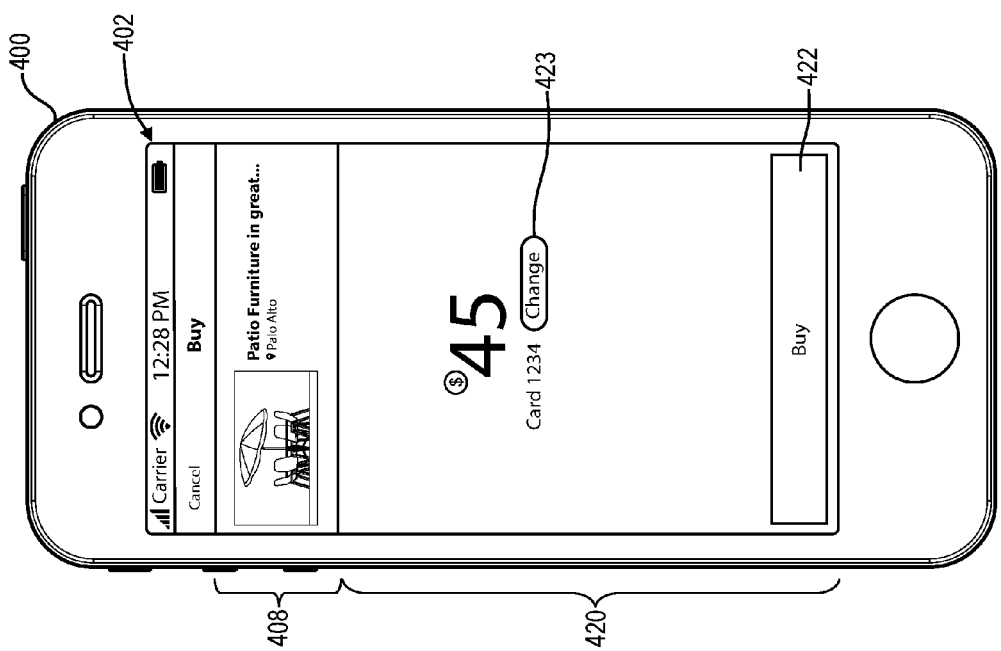

When the potential buyer selects the purchase option 414, the GUI 402 can change to display a purchasing interface in place of the real-time communication session 412. In particular, as shown in FIG. 4E, when the potential buyer selects the purchase option 414, the purchasing interface 420 appears within the GUI 402 along with the banner 411 displaying the structured data 408.

The purchasing interface 420 displays the price of the patio furniture set at $45. The purchasing interface 420 also shows the payment method option to be used upon the potential buyer selecting the buy button 422. If the potential buyer is satisfied with the price and payment method option displayed in the purchasing interface 420, the potential buyer can select the buy button 422. If, however, the potential buyer prefers to pay with a different payment method, the potential buyer can select the payment method option 423 within the purchasing interface 420 to change payment methods.

Upon buying the patio furniture set, the potential buyer becomes the buyer. In addition, as shown in FIG. 4F, the GUI 402 again displays the real-time communication session 412 with the seller 406 Steve Johnson. The GUI 402 continues to display the banner 411 having the structured data 408 for the patio furniture set to provide context to the real-time communication session 412 even after the patio furniture set has sold. The banner 411, however, has updated and replaced the purchase option 414 with a sold indicator 426. Further, in updating the sold indicator 426 in the banner, the social marketplace system also updates the structured data banners (and related content items) in other real-time communication sessions with the seller 406 Steve Johnson to mark the patio furniture set as sold. Furthermore, the social marketplace system updates the structured data in content item.

Additionally, the social marketplace system provides the buyer with a receipt. The real-time communication session 412 in FIG. 4F shows a receipt 424 for the patio furniture. The receipt 424 includes the time the transaction completed as well as the sold price. The receipt 424 also includes portions of the structured data, such as the name of the for sale item. In some instances, the receipt 424 also includes images of the for sale item, such as the images of the patio furniture set in the receipt 424 shown in FIG. 4F. In this manner, the social marketplace system uses the structured data to provide context to the transaction, should the buyer return at a later time and review previous purchase within the social marketplace system. For example, upon a buyer later reviewing and selecting a thumbnail image in a receipt, the social marketplace system can provide larger images of the for sale item and/or link the buyer to the original content item advertising the for sale item.

FIG. 4G illustrates another GUI 402 of the real-time communication session 412. The GUI 402 in FIG. 4G corresponds to FIG. 4D, but is seen from the perspective of the seller, (i.e., Steve Johnson). In particular, the GUI 402 shows the seller is communicating with the potential buyer 428 Bob Potter. Thus, as shown, the real-time communication session 412 in FIG. 4G includes the messages 416a, 416b from Bob Potter and reply messages 418a from Steve Johnson.

Like FIG. 4D, the GUI 402 in FIG. 4G shows the banner 411, which provides the structured data 408 for the patio furniture set to enhance the real-time communication session 412. Unlike FIG. 4D, however, Steve Johnson does not see the purchase option 414 in the banner 411 because Steve is the seller. Rather, as shown in FIG. 4G, the banner 411 includes a "Mark as Sold" option 430. The mark as sold option 430 may be useful when a potential buyer has committed to buy a for sale item but has not paid for the item or in the case that the seller pays for the sale item outside of the social marketplace system. For example, the seller may exchange cash for an item listed for sale. Alternatively, rather than showing the mark as sold option 430, the banner 411 can show other options, such as mark the sale as pending (e.g., pending pick up), or indicate that at least one potential buyer has provided an offer for the item.

FIG. 4H illustrates a GUI 402 of the real-time communication session 412 after Bob Potter has purchased the patio furniture set. The real-time communication session 412 in FIG. 4H corresponds to the real-time communication session 412 shown in FIG. 4F, but from the perspective of Steve Johnson, the seller. For example, the banner in FIG. 4H includes the sold indicator 426. In addition, the real-time communication session 412 in FIG. 4H shows the receipt 424 for Bob Potter buying the patio furniture set. As shown, the receipt 424 includes transactional data (e.g., the price, date, and time of the purchase) along with structured data 408 of the for sale item. In various embodiments, the social marketplace system allows sellers to save the receipt for future reference. Alternatively, the social marketplace system may automatically save the receipt for a seller.

In some embodiments, the receipt shown to a seller may include an option to refund the payment. For example, if the buyer requests to cancel the transaction or decides to return a purchased item, the seller can locate the receipt and use the refund option to refund some or all of the payment for the for sale item. Alternatively, the GUI 402 may include a refund option, but not include the refund option as part of the receipt, but elsewhere, such as in a menu selection associated with past sold items.

As described above, the social marketplace system may provide structured data in connection with a real-time communication session. In various embodiments, the social marketplace system may detect that the discussion in the real-time communication session has moved away from the for sale item or that a threshold time has passed since the for sale item has been sold to another buyer. In these embodiments, the social marketplace system can hide the structured data from the real-time communication session. If the discussion topic returns to the for sale item (e.g., the social marketplace system detects words related to the for sale item or the potential buyer re-selects the option to message the seller from the content item advertising the for sale item), the social marketplace system can again display the structured data. In this manner, friends who regularly message each other only see the structured data when discussing the for sale item.

FIGS. 5A-5F illustrate a graphical user interface of a client device 500 showing a potential buyer making an offer for a for sale item. The client device 500 in FIGS. 5A-5F show an example graphical user interface 502 (or simply, GUI 502). The client device 500 may include a touch screen where a user (e.g., a seller or a potential buyer) can provide input. In addition, the client device 500 can be an example embodiment of one of the client devices 102 described above.

In FIG. 5A, the GUI 502 shows a real-time communication session 512 with a seller 506 (i.e., Steve Johnson) as seen from the perspective of a potential buyer (i.e., Bob Potter). The GUI 502 also includes a banner 511 having structured data 508 of a patio furniture set for sale such that the banner 511 provides context to the real-time communication session 512, as described above. Unlike the structured data banner described above in connection with FIG. 4, the banner 511 also includes "OBO" (or best offer) next to the price indicating that the seller is willing to negotiate on the price. In connection with the OBO, the banner also includes a purchase option 530 that states, "Buy/Make Offer."

Included in the real-time communication session 512 are messages including a message 516a from Bob Potter and a reply message 518a from Steve Johnson the seller 506. In particular, Bob Potter asks in the message 516 if Steve Johnson would be willing to sell the patio furniture set for $30. In the reply message, Steve Johnson indicates that he is willing to accept the offer of $30.

To provide an offer, Bob Potter may select a purchase option 530 (shown as a "Buy/Make Offer" virtual button). Upon selecting the purchase option 530, the GUI 502 shown in FIG. 5B updates to show an offer interface 530. Within the offer interface 530, the potential buyer Bob Potter can input the offer of $30 and submit the offer using the offer button 534.

In some embodiments, the GUI 502 can display an offer confirmation. For example, as shown in FIG. 5C, the GUI 502 can prompt Bob Potter to confirm his offer of $30 using the offer submit option 536. Further, Bob Potter can clear the offer to re-enter a new offer. As an alternative to confirming and offer, when Bob Potter submits an offer using the offer button 534 (shown in FIG. 5B), the offer is directly submitter to the seller Steve Johnson.

As shown in FIG. 5D, when Bob Potter submits an offer, the real-time communication session 512 includes a receipt 524 showing the sale as pending. In particular, the receipt 524 is shown to the potential buyer Bob Potter and remains pending until the seller Steve Johnson accepts or declines the offer. If Steve Johnson rejects the offer, the real-time communication session 512 can remove the receipt 524. In addition, the banner 516 also shows a pending status replacing the purchase option previously shown.

Figure 5F:
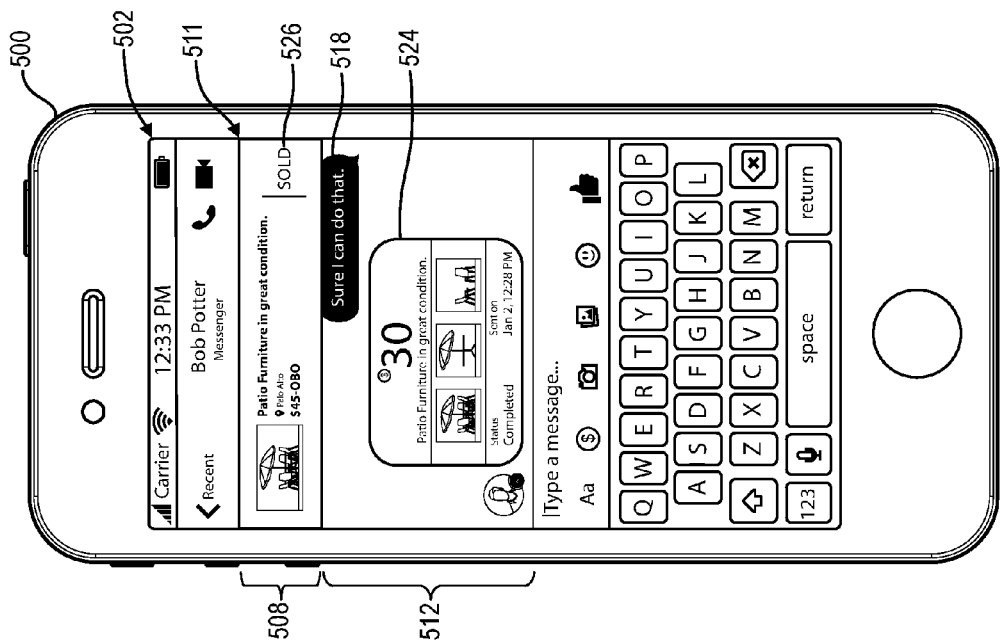
Figure 5E:
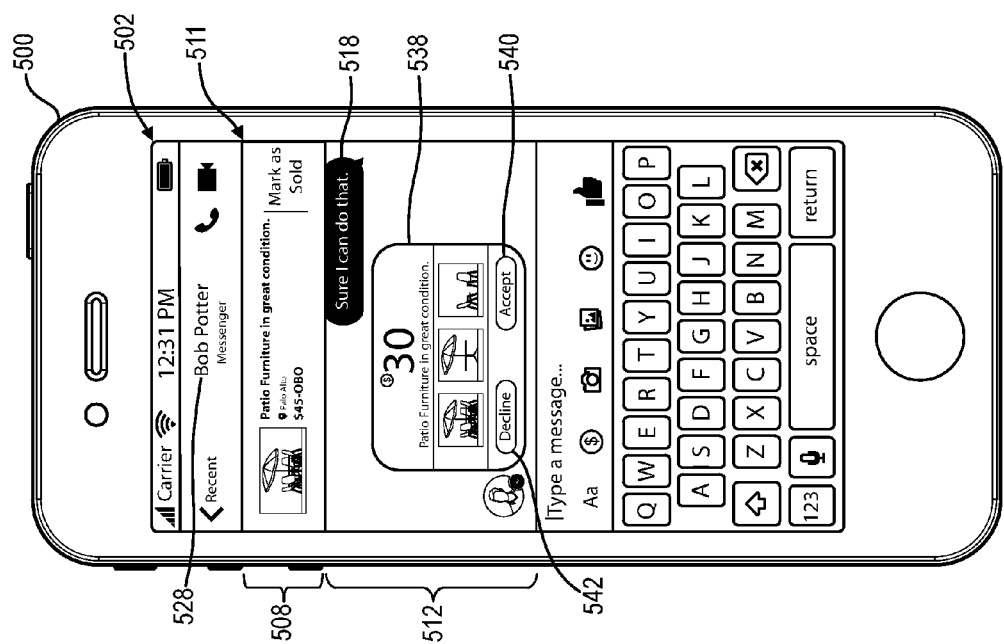

Upon Bob Potter making an offer, the GUI 502 presents the offer to the seller Steve Johnson. To illustrate, FIG. 5E shows the real-time communication session 512 from the perspective of the seller Steve Johnson. For example, the GUI 502 shows the seller 528 Bob Potter above the banner 511 showing the structured data 508 of the patio furniture set.

In addition, FIG. 5E also shows the offer 538 to Steve Johnson. The offer 538 includes structured data of the patio furniture set as well as an accept option 540 and a decline option 542. In some embodiments, the offer 538 can include an option to provide a counter-offer to Bob Potter. For example, if Steve Johnson selects the decline option 542, the GUI 502 can provide further options to Steve Johnson to make a counter-offer.

If Steve Johnson accepts the offer, the transaction completes and a receipt is provided to Steve Johnson and Bob Potter. For instance, as shown in FIG. 5F, the real-time communication session 512 displays the receipt 524 showing the completed transaction, which includes transactional data and structured data as described above. In addition, the banner 511 included with the real-time communication session can also update for all potential buyers to show that the patio furniture set is sold.

FIGS. 6A-6B illustrates a client device 600 showing a seller creating a real-time communication with a potential buyer. The client device 600 in FIGS. 6A-6B show an example graphical user interface 602 (or simply, GUI 502). The client device 600 may include a touch screen where a user (e.g., a seller or a potential buyer) can provide input. In addition, the client device 600 can be an example embodiment of one of the client devices 102 described above.

As shown, FIG. 6A shows a content item 604 for a patio furniture set within a social marketplace system and/or social networking system as seen from the perspective of the seller Steve Johnson. The content item 604 can include structured data 608 such as images and other information, as described above. The content item 604 can also include a comment section where potential buys, acquaintances of the seller, and other users can post comments. Comments can include questions to the seller or other users, answers, and/or other information related to the for sale item advertised in a content item.

To illustrate, a potential buyer, Ray Park, posts a first comment 640 in the comment section of the content item 604. As part of Ray Park's comment, he asks about delivery of the patio furniture set. Other potential buyers, such as Adam Haws, also post in the comment section.

The seller, Steve Johnson, can quickly respond to potential buyers who leave comments in the comment section. For example, because Steve Johnson is the seller, each comment in the comments section may have an option to message potential buyers who leave comments. In particular and as shown in FIG. 6A, the first comment 640 includes a message option 642 for Steve Johnson to message the potential buyer Ray Park. When another user besides the seller is viewing the comments, the social marketplace system 110 can hide the message option 642 or replace it with a comment reply option.

Upon Steve Johnson selecting the reply option 642 in the first comment 640, the GUI 602 can change to a real-time communication session 612 between Steve Johnson and Ray Park, as seen in FIG. 6B. In other words, by a seller selecting the message option, the social marketplace system 110 can establish a real-time communication session between the seller and the potential buyer who left the comment to the content item. The GUI 602 can include a banner 611 including structured data of the patio furniture set in connection with the real-time communication session 612, as described above.

As shown if FIG. 6B, the real-time communication session 612 includes the first comment as a message 616. In this manner, in addition to providing the context of the real-time communication session 612 focusing on the patio furniture set, the real-time communication session 612 can also include a previous comment as a message to streamline the discussion between a potential buyer and the seller and provide further context to the discussion. As such, Steve Johnson can provide a reply message 618 within the real-time communication session 612. Further, Steve Johnson and the potential buyer Ray Park can continue the real-time communication session 612, as described above.

In some embodiments, the client device 600 includes a various input options 644 as part of the real-time communication session 612. For example, the client device 600 can allow a user to input text, graphics, pictures, emojis, stickers, etc. Further, when the social marketplace system detects that the real-time communication session involves a potential transaction, the social marketplace system can also add a payment option 646 to the input options 644. In some embodiments, the social marketplace system can prioritize the location of the payment option 646 and/or otherwise emphasize the availability of the payment option 646.

A user can use the payment option 646 to send money to another user. In particular, when a potential buyer needs to pay for additional services, such as shipping, multiple items, customized orders, etc., the potential buyer can select the payment option 646 and provide payment for the additional service. As another example, a seller can issue a refund to a buyer via the payment option 646, such as when a buyer saves money on shipping when buying multiple items at the same time.

In various embodiments, if the payment option 646 is shown in connection with a for sale item, the user (e.g., a potential buyer/buyer or seller) can further select whether to associate the for sale item with the payment made using the payment option 646 or whether to process the transaction independent of the for sale item. For example, if a potential buyer provides a payment to a seller using the payment option 646, the potential buyer can associate the payment with a for sale item or indicate that the payment includes the for sale item. For instance, a buyer may use the payment option 646 to pay for the for sale item as well as additional shipping charges.

Figure 7:
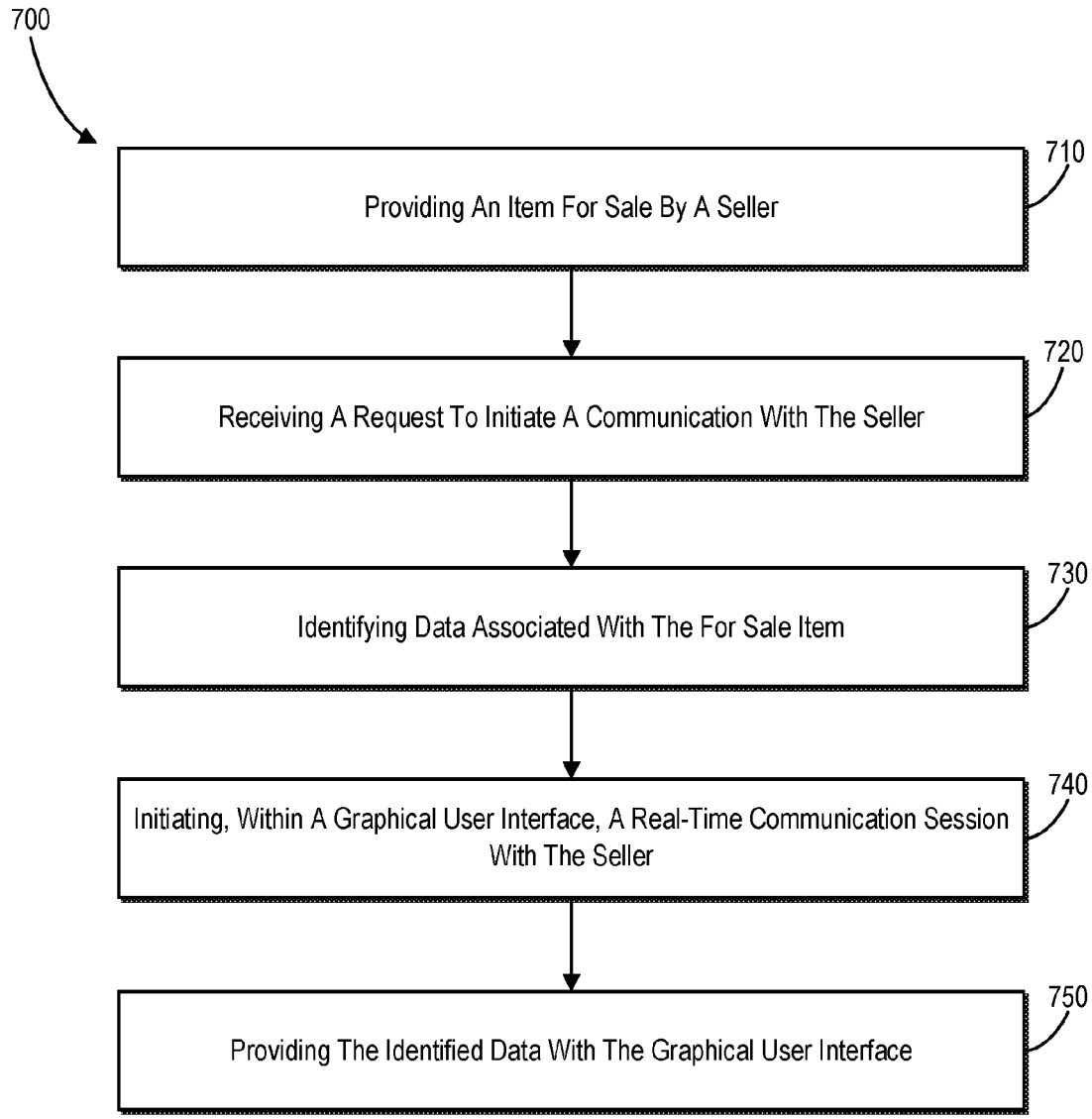
FIG. 7 illustrates a flowchart of a method of automatically providing identified structured data with a real-time communication session in accordance with one or more embodiments described herein.

FIGS. 1-6, the corresponding text, and the examples, provide a number of different systems and devices for improving a user experience for performing transactions between potential buyers and sellers online via real-time communications. In addition to the foregoing, embodiments of the present invention also can be described in terms of flowcharts comprising acts and steps in a method for accomplishing a particular result. For example, FIG. 7 illustrates a flowchart of an exemplary method in accordance with one or more embodiments of the present invention. The method described in relation to FIG. 7 can be performed with less or more steps/acts or the steps/acts can be performed in differing orders. Additionally, the steps/acts described herein can be repeated or performed in parallel with one another or in parallel with different instances of the same or similar steps/acts.

FIG. 7 illustrates a flowchart of a method 700 of automatically providing identified structured data with a real-time communication. For example, the method 700 can include an act 710 of providing an item for sale by a seller 406. In particular, the act 710 can include providing, to a first user 428, a content item 404 associated with an item for sale by a seller 406. For example, the act 710 can include posting the content item 404 in a social marketplace system 110 and/or a social networking system 112.

Furthermore, the method 700 can also include an act 720 of receiving a request to initiate a communication with the seller 406. In particular, the act 720 can include receiving a request from the first user 428 with respect to the content item 404 to initiate a communication with the seller 406. For example, the act 720 can include the first user 428 selecting a messaging option within the content item 404 to establish a communication with the seller 406.

In addition, the method 700 further includes an act 730 of identifying data associated with the for sale item. In particular, the act 730 may include identifying structured data 408 associated with the for sale item from the content item 404. In some embodiments, the identified structured data 408 includes a title, a price, a location, and/or an image of the for sale item.

Additionally, the method 700 can also include an act 740 of initiating, within a graphical user interface, a real-time communication session with the seller. In particular, the act 740 may include initiating, within a graphical user interface 402, a real-time communication session 412 between the first user 428 and the seller 406. In one or more embodiments, the act 740 can include automatically porting messages into the real-time communication session 412.

Furthermore, the method 700 can include an act 750 of providing the identified data within a graphical user interface 402. In particular, the act 750 may include providing the identified structured data 408 within the graphical user interface 402. For example, the act 750 may include displaying the identified structured data 408 within a banner 411 in a fixed location within the graphical user interface 402. In some embodiments, the act 750 also includes displaying to the first user 428, in connection with the identified structured data 408 of the real-time communication session 412, a purchase option 414 for the first user 428 to purchase the for sale item.

In some embodiments, the method 700 also includes additional acts. For example, the method 700 may include the acts of detecting a selection of the purchase option 414, providing, to the first user 428 and within the real-time communication session 412, an option 534 to modify the price of the for sale item, receiving, from the first user 428 within the real-time communication session 412, a modified price for the for sale item, providing, to the seller 406 within the real-time communication session 412, the modified price for the for sale item, and receiving, from the seller 406 within the real-time communication session 412, an acceptance 540 or rejection 542 of the modified price for the for sale item. As an additional example, the method 700 can include an act of comprising processing a purchase of the for sale item for the first user 428 at the modified offer price based upon the seller accepting the modified price offer.

In addition, the method 700 can also includes an act of providing, to the first user 428 and the seller 406, a receipt 424 for the purchase of the item within the real-time communication session 412, the receipt 424 including the structured data 408 and the modified price. Further, the method 700 can include an act of detecting that the first user 428 purchased the for sale item and in response to determining that the for sale item has been purchased marking the for sale item as sold within the real-time communication session between the first user 428 and the seller 426 and marking the for sale item as sold within the additional real-time communication session between a second user and the seller 406.

In some embodiments, the method 700 may also include an act of marking the for sale item as sold across multiple communication platform, where the multiple communication platform includes a mobile application communication platform, a web-interface communication platform, and a multimedia communication platform.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
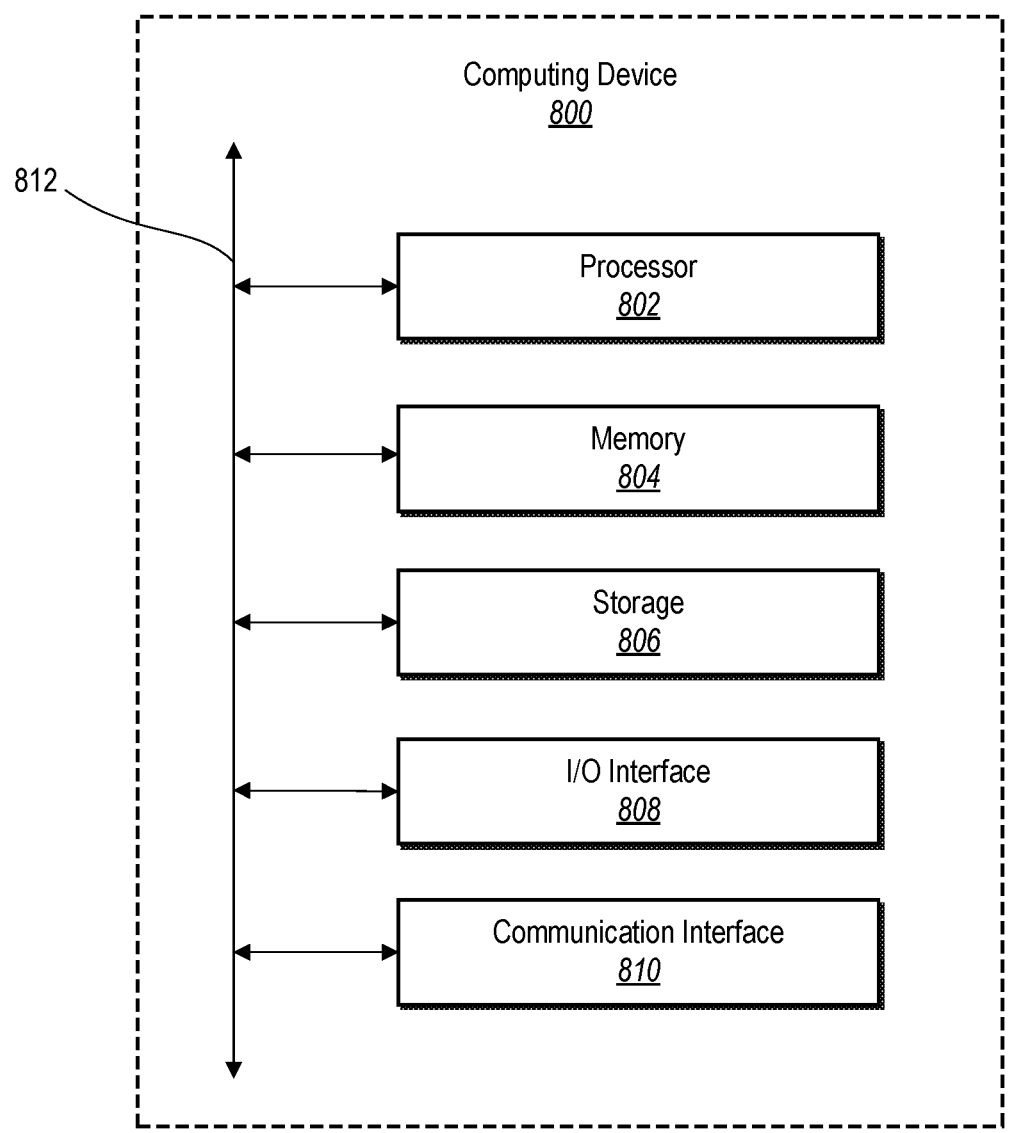
FIG. 8 illustrates a block diagram of a client device in accordance with one or more embodiments described herein.

FIG. 8 illustrates a block diagram of exemplary computing device 800 that may be configured to perform one or more of the processes described above. One will appreciate that the computing device 800 may represent one or more client devices, such as the client devices 102, 400, 500, and 600 as well as one or more server devices, such as the server device(s) 106. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the social marketplace system 110 can be included in a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 9:
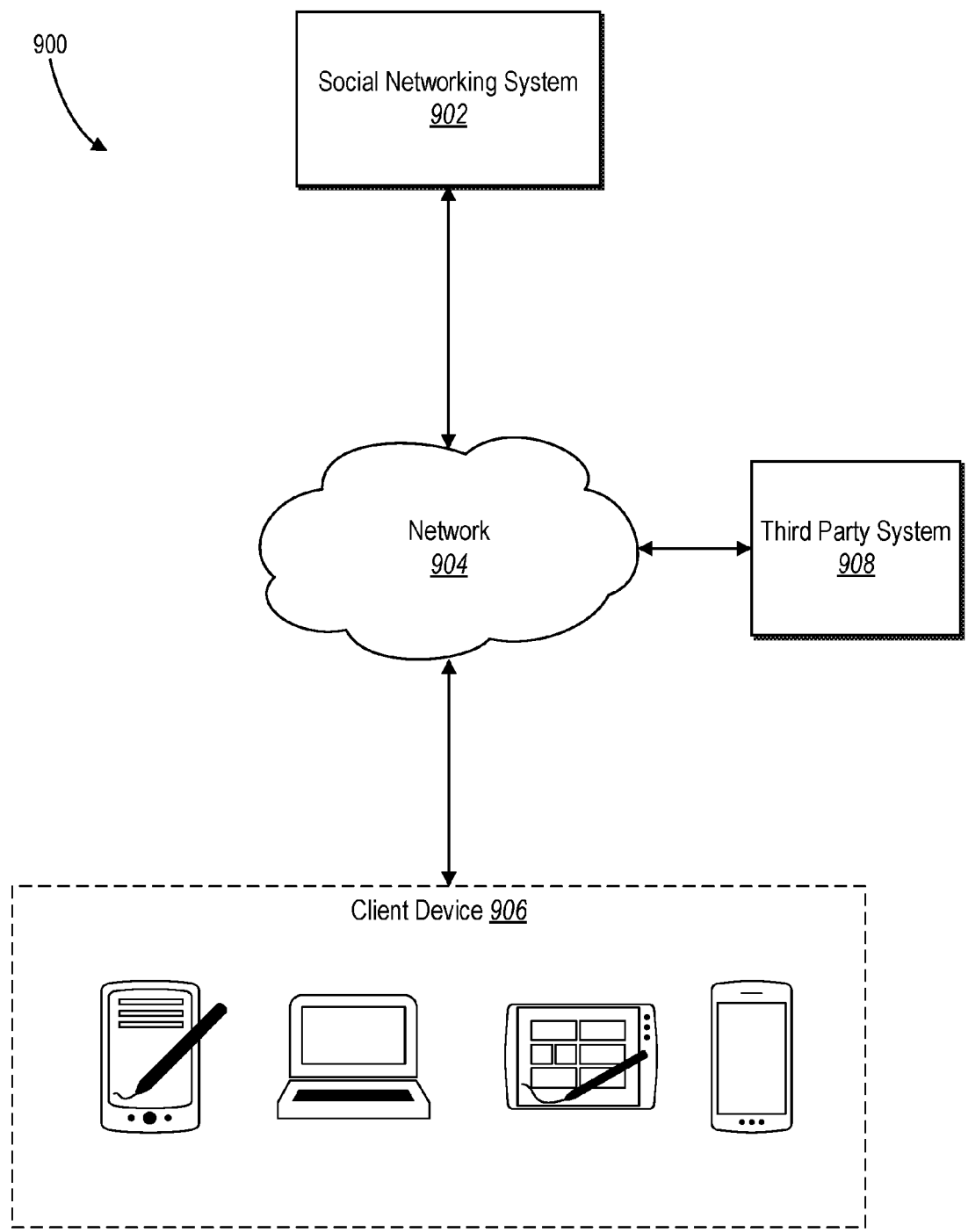
FIG. 9 illustrates a network environment of a social networking system in accordance with one or more embodiments described herein.

FIG. 9 illustrates an example network environment 900 of a social networking system. Network environment 900 includes a client system 906, a social networking system 902, and a third-party system 908 connected to each other by a network 904. Although FIG. 9 illustrates a particular arrangement of client system 906, social networking system 902, third-party system 908, and network 904, this disclosure contemplates any suitable arrangement of client system 906, social networking system 902, third-party system 908, and network 904. As an example and not by way of limitation, two or more of client system 906, social networking system 902, and third-party system 908 may be connected to each other directly, bypassing network 904. As another example, two or more of client system 906, social networking system 902, and third-party system 908 may be physically or logically co-located with each other in whole, or in part. Moreover, although FIG. 9 illustrates a particular number of client systems 906, social networking systems 902, third-party systems 908, and networks 904, this disclosure contemplates any suitable number of client systems 906, social networking systems 902, third-party systems 908, and networks 904. As an example and not by way of limitation, network environment 900 may include multiple client system 906, social networking systems 902, third-party systems 908, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client system 906, social networking system 902, and third-party system 908 to communication network 904 or to each other. This disclosure contemplates any suitable links. In some embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In some embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In some embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include any of the computing devices discussed above in relation to FIG. 8. A client system 906 may enable a network user at client system 906 to access network 904. A client system 906 may enable its user to communicate with other users at other client systems 906.

In some embodiments, client system 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system 908), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In some embodiments, social networking system 902 may be a network-addressable computing system that can host an online social network. Social networking system 902 may generate, store, receive, and send social-networking data, such as, for example, user-profile data, concept-profile data, social-graph information, or other suitable data related to the online social network. Social networking system 902 may be accessed by the other components of network environment 900 either directly or via network 904. In some embodiments, social networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In some embodiments, each server may include hardware, software, or embedded logic components or a combination of two or more such components for carrying out the appropriate functionalities implemented or supported by server. In some embodiments, social networking system 902 may include one or more data stores. Data stores may be used to store various types of information. In some embodiments, the information stored in data stores may be organized according to specific data structures. In some embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, a social networking system 902, or a third-party system 908 to manage, retrieve, modify, add, or delete, the information stored in data store.

In some embodiments, social networking system 902 may store one or more social graphs in one or more data stores. In some embodiments, a social graph may include multiple nodes—which may include multiple user nodes (each corresponding to a particular user) or multiple concept nodes (each corresponding to a particular concept)—and multiple edges connecting the nodes. Social networking system 902 may provide users of the online social network the ability to communicate and interact with other users. In some embodiments, users may join the online social network via social networking system 902 and then add connections (e.g., relationships) to a number of other users of social networking system 902 whom they want to be connected to. Herein, the term "friend" may refer to any other user of social networking system 902 with which a user has formed a connection, association, or relationship via social networking system 902.

In some embodiments, social networking system 902 may provide users with the ability to take actions on various types of items or objects, supported by social networking system 902. As an example and not by way of limitation, the items and objects may include groups or social networks to which users of social networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 902 or by an external system of third-party system 908, which is separate from social networking system 902 and coupled to social networking system 902 via a network 904.

In some embodiments, social networking system 902 may be capable of linking a variety of entities. As an example and not by way of limitation, social networking system 902 may enable users to interact with each other as well as receive content from third-party systems 908 or other entities, or to allow users to interact with these entities through an application programming interfaces (API) or other communication channels.

In some embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social networking system 902. In some embodiments, however, social networking system 902 and third-party systems 908 may operate in conjunction with each other to provide social-networking services to users of social networking system 902 or third-party systems 908. In this sense, social networking system 902 may provide a platform, or backbone, which other systems, such as third-party systems 908, may use to provide social-networking services and functionality to users across the Internet.

In some embodiments, a third-party system 908 may include a third-party content object provider. A third-party content object provider may include one or more sources of content objects, which may be communicated to a client system 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In some embodiments, social networking system 902 also includes user-generated content objects, which may enhance a user's interactions with social networking system 902. User-generated content may include anything a user can add, upload, send, or "post" to social networking system 902. As an example and not by way of limitation, a user communicates posts to social networking system 902 from a client system 906. Posts may include data such as status updates or other textual data, location information, photos, videos, links, music or other similar data or media. Content may also be added to social networking system 902 by a third-party through a "communication channel," such as a newsfeed or stream.

In some embodiments, social networking system 902 may include a variety of servers, sub-systems, programs, modules, logs, and data stores. In some embodiments, social networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 902 may also include suitable components such as network interfaces, security mechanisms, load balancers, failover servers, management-and-network-operations consoles, other suitable components, or any suitable combination thereof. In some embodiments, social networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 902 to one or more client systems 906 or one or more third-party system 908 via network 904. The web server may include a mail server or other messaging functionality for receiving and routing messages between social networking system 902 and one or more client systems 906. An API-request server may allow a third-party system 908 to access information from social networking system 902 by calling one or more APIs. An action logger may be used to receive communications from a web server about a user's actions on or off social networking system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from client system 906 responsive to a request received from client system 906. Authorization servers may be used to enforce one or more privacy settings of the users of social networking system 902. A privacy setting of a user determines how particular information associated with a user can be shared. The authorization server may allow users to opt in to or opt out of having their actions logged by social networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client systems 906 associated with users. Advertisement-pricing modules may combine social information, the current time, location information, or other suitable information to provide relevant advertisements, in the form of notifications, to a user.

Figure 10:
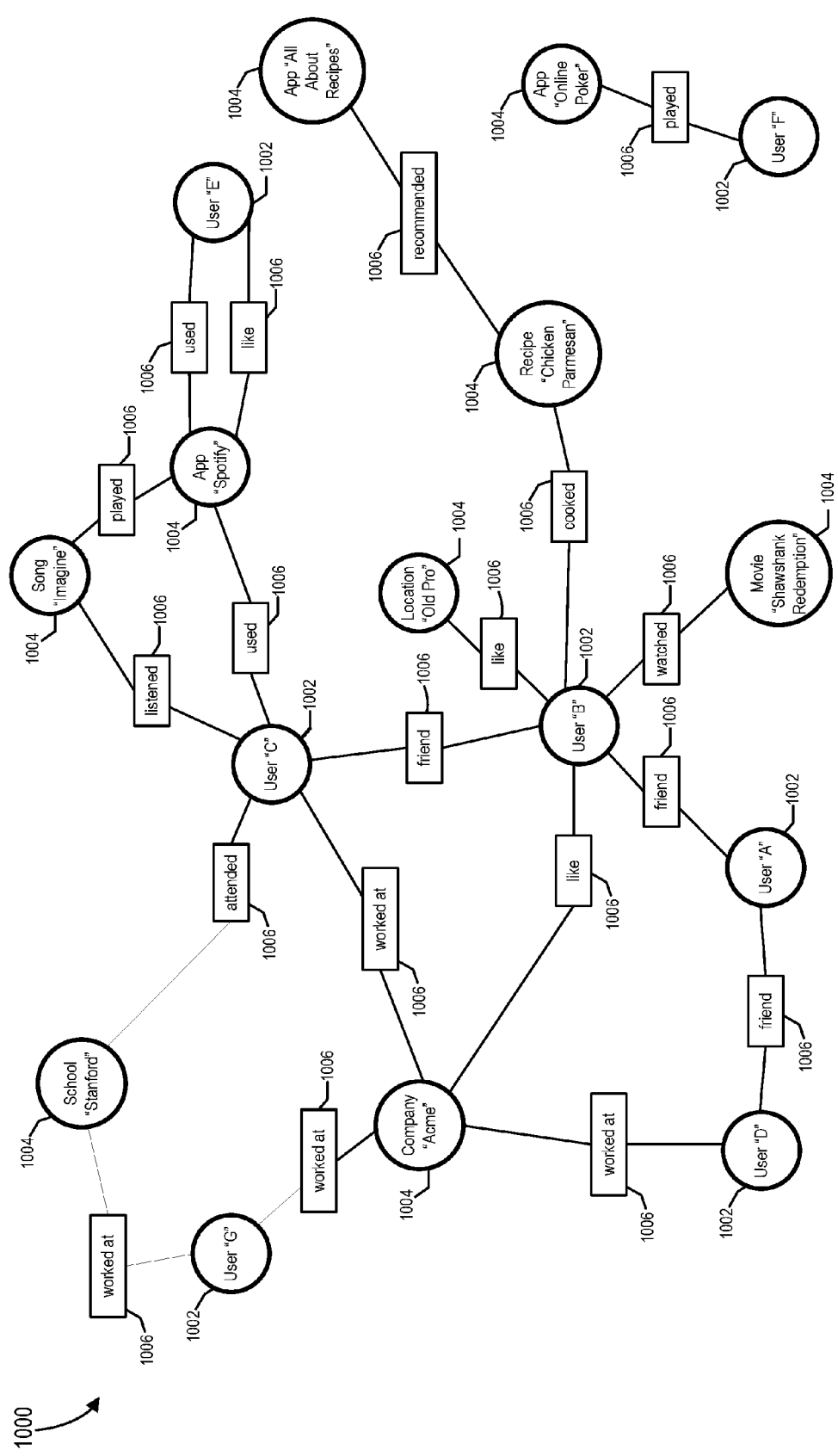
FIG. 10 illustrates an example social graph of a social networking system in accordance with one or more embodiments described herein.

FIG. 10 illustrates example social graph 1000. In some embodiments, social networking system 902 may store one or more social graphs 1000 in one or more data stores. In some embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In some embodiments, a social networking system 902, client system 906, or third-party system 908 may access social graph 1000 and related social-graph information for suitable applications.

The nodes and edges of social graph 1000 may be stored as data objects, for example, in a data store (such as a social-graph database). Such a data store may include one or more searchable or query able indexes of nodes or edges of social graph 1000.

In some embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In some embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social networking system 902. In some embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In some embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In some embodiments, a concept node 1004 may be associated with one or more data objects corresponding to information associated with concept node 1004. In some embodiments, a concept node 1004 may correspond to one or more webpages.

In some embodiments, a node in social graph 1000 may represent or be represented by a webpage (which may be referred to as a "profile page"). Profile pages may be hosted by or accessible to social networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In some embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In some embodiments, a pair of nodes in social graph 1000 may be connected to each other by one or more edges 1006. An edge 1006 connecting a pair of nodes may represent a relationship between the pair of nodes. In some embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In some embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In some embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social networking system 902 a message indicating the user's liking of the concept associated with the concept-profile page. In response to the message, social networking system 902 may create an edge 1006 between user node 1002 associated with the user and concept node 1004, as illustrated by "like" edge 1006 between the user and concept node 1004. In some embodiments, social networking system 902 may store an edge 1006 in one or more data stores. In some embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In some embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In some embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In some embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In some embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In some embodiments, social networking system 902 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In some embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In some embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In some embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth.

As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In some embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In some embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In some embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In some embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In some embodiments, social networking system 902 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In some embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In some embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In some embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In some embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In some embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In some embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In some embodiments, privacy settings may allow users to opt in or opt out of having their actions logged by social networking system 902 or shared with other systems (e.g., third-party system 908). In some embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In some embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
providing, by a server device and to a client device associated with a first user, a content item associated with an item for sale by a seller;
receiving, by the server device, a request from the first user with respect to the content item to initiate a communication with the seller;
identifying, by the server device, structured data associated with the for sale item from the content item;
generating, by the server device and within a graphical user interface, a real-time communication session between the first user and the seller that includes the identified structured data, wherein the identified structured data is displayed within a banner in a fixed location within the graphical user interface;
providing, within a communication application on the client device associated with the first user, the graphical user interface comprising real-time communication session that includes the identified structured data; and
maintaining the fixed location of the banner comprising the identified structured data within the graphical user interface as communications are added to the real-time communication session and scroll out of the graphical user interface.

2. The method of claim 1, wherein the identified structured data comprises a status of the item for sale that is dynamically updated to reflect availability of the item.

3. The method of claim 2, wherein the identified structured data further comprises a title, a price, and a location, and an image of the for sale item.

4. The method of claim 3, further comprising displaying to the client device associated with the first user, in connection with the identified structured data of the real-time communication session, a purchase option for the first user to purchase the for sale item.

5. The method of claim 4, further comprising:
detecting a selection of the purchase option;
providing, to the client device associated with the first user and within the real-time communication session, an option to modify the price of the for sale item;
receiving, from the client device associated with the first user within the real-time communication session, a modified price for the for sale item;
providing, to the client device associated with the seller within the real-time communication session, the modified price for the for sale item; and
receiving, from the client device associated with the seller within the real-time communication session, an acceptance or rejection of the modified price for the for sale item.

6. The method of claim 5, further comprising processing a purchase of the for sale item for the first user at the modified price based upon the client device associated with the seller providing acceptance of the modified price.

7. The method of claim 6, further comprising providing, to the client device associated with the first user and the client device associated with the seller, a receipt for the purchase of the item within the real-time communication session, the receipt comprising the structured data and the modified price.

8. The method of claim 4, further comprising displaying, within the real-time communication session, a selectable option for the first user to send money to a second user separate from the purchase option for the first user to purchase the for sale item.

9. The method of claim 1, further comprising:
providing, to a client device associated with a second user, the content item having the item for sale by the seller;
detecting, by the client device associated with the second user, a selection with respect to the content item to initiate a new real-time communication between the second user and the seller;
creating an additional real-time communication session between the second user and the seller, wherein the additional real-time communication session is separated from the first real-time communication session between the first user and the seller; and
providing the identified structured data within the additional real-time communication session to the client device associated with second user.

10. The method of claim 9, further comprising:
detecting that the first user purchased the for sale item; and
in response to determining that the for sale item has been purchased:
marking the for sale item as sold within the real-time communication session between the first user and the seller; and marking the for sale item as sold within the additional real-time communication session between the second user and the seller.

11. The method of claim 10, further comprising marking the for sale item as sold across multiple communication platforms, wherein the multiple communication platforms comprise a mobile application communication platform, a web-interface communication platform, and a multimedia communication platform.

12. The method of claim 1, wherein receiving the request from the client device associated with the first user with respect to the content item to initiate a communication with the seller is in response to the first user selecting a messaging option within the content item.

13. A system comprising:
at least one processor; and
at least one non-transitory computer readable storage medium storing instructions that, when executed by the at least one processor, cause the system to:
provide, to a first user, a content item associated with an item for sale by a seller;
receive a request from the first user with respect to the content item to initiate a communication with the seller;
identify structured data associated with the for sale item from the content item;
generate, within a graphical user interface, a real-time communication session between the first user and the seller that includes the identified structured data, wherein the identified structured data is displayed within a banner in a fixed location within the graphical user interface;
provide, within a communication application on the client device associated with the first user, the graphical user interface comprising real-time communication session that includes the identified structured data; and
maintain the fixed location of the banner comprising the identified structured data within the graphical user interface as communications are added to the real-time communication session and scroll out of the graphical user interface.

14. The system of claim 13, further comprising instructions that, when executed by the at least one processor, cause the system to:
provide, to a client device associated with a second user, the content item having the item for sale by the seller;
detect, by the client device associated with the second user, a selection with respect to the content item to initiate a new real-time communication between the second user and the seller;
create an additional real-time communication session between the second user and the seller, wherein the additional real-time communication session is separated from the first real-time communication session between the first user and the seller; and
providing the identified structured data within the additional real-time communication session to the client device associated with second user.

15. The system of claim 14, further comprising instructions that, when executed by the at least one processor, cause the system to:
detect that the first user purchased the for sale item; and
in response to determining that the for sale item has been purchased:

mark the for sale item as sold within the real-time communication session between the first user and the seller; and mark the for sale item as sold within the additional real-time communication session between the second user and the seller.

16. The system of claim 13, wherein the identified structured data comprises a title, a price, and a location and an image of the for sale item.

17. A non-transitory computer readable medium storing instructions that, when executed by at least one processor, cause a computer system to provide, to a client device associated with a first user, a content item associated with an item for sale by a seller;

receive a request from the first user with respect to the content item to initiate a communication with the seller;

identify structured data associated with the for sale item from the content item;

generate, within a graphical user interface, a real-time communication session between the first user and the seller that includes the identified structured data, wherein the identified structured data is displayed within a banner in a fixed location within the graphical user interface;

provide within a communication application on the client device associated with the first user, the graphical user interface comprising real-time communication session that includes the identified structured data; and maintain the fixed location of the banner comprising the identified structured data within the graphical user interface as communications are added to the real-time communication session and scroll out of the graphical user interface.

18. The non-transitory computer readable medium of claim 17, wherein the identified structured data comprises a status of the item for sale that is dynamically updated to reflect availability of the item.

19. The non-transitory computer readable medium of claim 18, wherein the identified structured data further comprises a title, a price, and a location, and an image of the for sale item.

20. The non-transitory computer readable medium 17, further comprising instructions that, when executed by the at least one processor, cause the computer system to display to the client device associated with the first user, in connection with the identified structured data of the real-time communication session, a purchase option for the first user to purchase the for sale item.

* * * * *